(12) United States Patent
Maeda

(10) Patent No.: US 10,045,045 B2
(45) Date of Patent: *Aug. 7, 2018

(54) MOTION VECTOR CODING APPARATUS, METHOD AND PROGRAM FOR CODING MOTION VECTOR, MOTION VECTOR DECODING APPARATUS, AND METHOD AND PROGRAM FOR DECODING MOTION VECTOR

(71) Applicant: CANON KABUSHIKI KAISHA, Tokyo (JP)

(72) Inventor: Mitsuru Maeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,640

(22) Filed: Dec. 27, 2016

(65) Prior Publication Data
US 2017/0111653 A1    Apr. 20, 2017

Related U.S. Application Data

(63) Continuation of application No. 14/356,529, filed as application No. PCT/JP2012/006987 on Oct. 31, 2012, now Pat. No. 9,681,126.

(30) Foreign Application Priority Data

Nov. 7, 2011    (JP) .................................. 2011-243936

(51) Int. Cl.
*H04N 19/52*    (2014.01)
*H04N 19/46*    (2014.01)
(Continued)

(52) U.S. Cl.
CPC ........... *H04N 19/52* (2014.11); *H04N 19/105* (2014.11); *H04N 19/187* (2014.11); *H04N 19/46* (2014.11); *H04N 19/172* (2014.11); *H04N 19/176* (2014.11)

(58) Field of Classification Search
CPC .. H04N 19/105; H04N 19/172; H04N 19/176; H04N 19/187; H04N 19/46; H04N 19/52; H04N 19/513
See application file for complete search history.

(56) References Cited

U.S. PATENT DOCUMENTS

| 2006/0126962 A1* | 6/2006 | Sun ....................... H04N 19/139 382/268 |
| 2014/0192884 A1* | 7/2014 | Laroche ............... H04N 19/105 375/240.16 |
| 2014/0301446 A1* | 10/2014 | Maeda ............. H04N 19/00024 375/240.02 |

FOREIGN PATENT DOCUMENTS

JP          06184558 B2    8/2017

OTHER PUBLICATIONS

Hong D et al.; "Scalability Support in HEVC;" Joint Collaborative Team on Video Coding (JCT-VC) of ITU-T SG16 WP3 and ISO/IEC JTC1/SC29/WG11 6th Meeting, JCTVC-F290; pp. 890-893.
(Continued)

*Primary Examiner* — Behrooz Senfi
(74) *Attorney, Agent, or Firm* — Canon U.S.A., Inc. IP Division

(57) ABSTRACT

According to exemplary embodiments of the present invention, references to a motion vector in a neighboring block of an enhancement layer or in a block of a previously coded picture, and a motion vector of a base layer are equally handled. Accordingly, a motion_prediction_flag with identification information can be integrated for further improved coding efficiency.

20 Claims, 17 Drawing Sheets

(51) Int. Cl.
*H04N 19/187* (2014.01)
*H04N 19/105* (2014.01)
H04N 19/513 (2014.01)
H04N 19/176 (2014.01)
H04N 19/172 (2014.01)

(56) References Cited

OTHER PUBLICATIONS

McCann K. et al.; "Samsung's Response to the Call for Proposals on Video Compression Technology;" Joint collaborative Team on Video Coding (JCT-VC) of ITU-T SG16 WP3 and ISO/IEC JTC1/SC29/WG11 1st Meeting, JCTVC-A124; Apr. 2010; pp. 1-42.

* cited by examiner

MOTION VECTOR CODING APPARATUS, METHOD AND PROGRAM FOR CODING MOTION VECTOR, MOTION VECTOR DECODING APPARATUS, AND METHOD AND PROGRAM FOR DECODING MOTION VECTOR

CROSS-REFERENCE TO RELATED APPLICATION

This application is a Continuation of U.S. application Ser. No. 14/356,529, filed May 6, 2014, which is a National Phase application of International Application No. PCT/JP2012/006987, filed Oct. 31, 2012, which claims priority from Japanese Patent Application No. 2011-243936 filed Nov. 7, 2011, which is hereby incorporated by reference herein in its entirety.

TECHNICAL FIELD

The present invention relates to coding and decoding of an image, and more particularly to coding and decoding of a motion vector for motion compensation.

BACKGROUND ART

H.264/Moving Picture Experts Group (MPEG)-4 Advanced Video Coding (AVC) (hereinafter abbreviated as H.264), is known as a coding method for moving image compression recording (International Organization for Standardization (ISO)/International Electrotechnical Commission (IEC) 14496-10:2010 Information technology—Coding of audio-visual objects—Part 10: Advanced Video Coding). Similar to conventional coding methods, H.264 performs motion compensation by referring to other pictures for improved coding efficiency. Motion vectors can be coded in units of macro-blocks (16 pixels*16 pixels) or blocks (eight pixels*eight pixels). To code a motion vector, a predicted motion vector is calculated by using a median value of motion vectors in neighboring blocks (left, above, and upper right). An error between the predicted motion vector and the motion vector is then coded.

H.264 is capable of hierarchical coding, which is discussed in the Annex G Scalable Video Coding section of H.264. In the case of spatial scalability, a motion vector in a block of a base layer can be magnified to generate a predicted motion vector (hereinafter, referred to as an interlayer predicted motion vector). A motion vector of the enhancement layer may be coded by using the interlayer predicted motion vector instead of an ordinary median value of motion vectors. More specifically, the magnified motion vector can be used when motion_prediction_flag is TRUE.

International standardization activities for coding methods of even higher efficiency as a successor to H.264 have been recently started. The International Organization for Standardization and the International Electrotechnical Commission (ISO/IEC) and the International Telecommunication Union (ITU) Telecommunication Standardization Sector (ITU-T) established the Joint Collaborative Team on Video Coding (JCT-VC) for that purpose. JCT-VC promotes standardization of the High Efficiency Video Coding scheme (hereinafter, abbreviated as HEVC). In HEVC, Advanced Motion Vector Prediction (AMVP) is discussed as a new motion vector coding method (JCT-VC document JCTVC-A124_r2.doc, the Internet <http://wftp3.itu.int/av-arch/jctvc-site/2010_04_A_Dresden/>). AMVP uses not only a median value of motion vectors in neighboring blocks as a reference motion vector, but also the motion vectors in the neighboring blocks themselves as reference motion vectors. Aside from the motion vectors in the neighboring blocks, a motion vector in a block at the same position of the previous picture in coding order (hereinafter, referred to as a temporal direction predicted motion vector) is also included in predicted motion vectors. Motion vectors including the same components among such predicted motion vectors are integrated to reduce target motion vectors, from which a closest motion vector is selected. A code for identifying the selected motion vector (hereinafter, referred to as a predicted vector index code) and a prediction error resulting from the prediction are then coded for improved coding efficiency.

When hierarchical coding is implemented in HEVC, whether to refer to motion vectors in an enhancement layer or in a base layer is selected like H.264. If reference motion vectors may be selected like H.264, the above-described method may be used. However, the above-described method has an issue of failing to improve the coding efficiency because both an AMVP-based predicted vector index code and a flag for selecting prediction of an interlayer motion vector are needed.

CITATION LIST

Non Patent Literature

[NPL 1]
International Organization for Standardization (ISO)/International Electrotechnical Commission (IEC) 14496-10: 2010 Information technology—Coding of audio-visual objects—Part 10: Advanced Video Coding
[NPL 2]
JCT-VC document JCTVC-A124_r2.doc, the Internet <http://wftp3.itu.int/av-arch/jctvc-site/2010_04_A_Dresden/>

SUMMARY OF INVENTION

The present invention is directed to coding a motion vector of an enhancement layer of hierarchical coding with a simpler configuration to improve the coding efficiency.

According to an aspect of the present invention, a motion vector coding apparatus includes a motion vector calculation unit configured to calculate a motion vector in a block of an enhancement layer to be coded, an interlayer predicted motion vector extraction unit configured to extract a motion vector in a block at a position corresponding to the block to be coded on image data of a base layer as an interlayer predicted motion vector, a neighboring reference motion vector extraction unit configured to extract a motion vector in a block of the enhancement layer neighboring the block to be coded as a neighboring reference motion vector, a selection unit configured to select a predicted motion vector for predicting a motion vector of the enhancement layer to be coded from a reference motion vector group including the neighboring reference motion vector and the interlayer predicted motion vector, a motion vector prediction unit configured to predict a motion vector to be coded using the selected predicted motion vector, and calculate a prediction error, and a coding unit configured to code identification information for identifying the selected predicted motion vector and the prediction error.

According to exemplary embodiments of the present invention, references to a motion vector in a neighboring block of an enhancement layer or in a block of a previously coded picture, and a motion vector of a base layer are equally handled. Accordingly, a motion_prediction_flag with identification information can be integrated for further improved coding efficiency.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
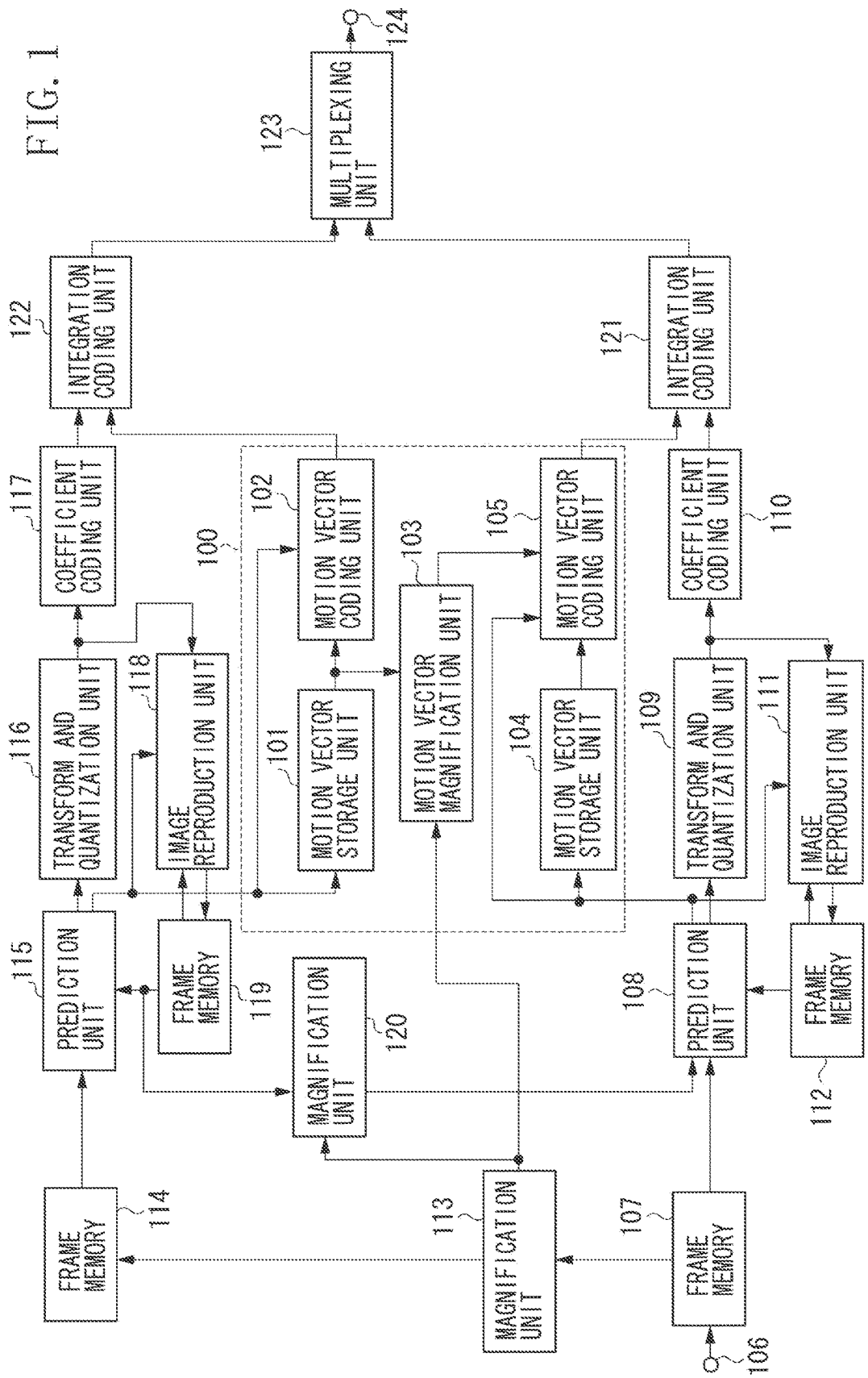
FIG. 1 is a block diagram illustrating a configuration of an image coding apparatus according to a first exemplary embodiment.

A first exemplary embodiment of the present invention will be described below with reference to the drawings. FIG. 1 is a block diagram illustrating an image coding apparatus according to the present exemplary embodiment. In FIG. 1, image data is input to a terminal 106. A frame memory 107 stores the input image data picture by picture. A magnification unit 113 magnifies the input image data by a magnification n/m (n and m are positive numbers). A frame memory 114 stores the magnified image data picture by picture.

Prediction units 108 and 115 segment image data into a plurality of blocks and perform intraframe prediction, such as intra prediction, and inter prediction by the motion compensation to generate predicted image data. The prediction methods are not limited thereto. The prediction units 108 and 115 further calculate prediction errors from the input image data and the predicted image data, and output the calculated prediction errors. For inter prediction, the prediction units 108 and 115 refer to other coded pictures to calculate and output motion vectors. The prediction units 108 and 115 also output information needed for prediction, such as information about an intra prediction mode, along with the prediction errors.

Transform and quantization units 109 and 116 orthogonally transform the prediction errors in units of blocks to obtain transform coefficients, and further perform quantization to obtain quantization coefficients. Frame memories 112 and 119 store reproduced image data.

Image reproduction units 111 and 118 input the quantization coefficients in units of blocks, perform inverse quantization to obtain transform coefficients, and further perform inverse orthogonal transform to reproduce prediction errors. In addition, the image reproduction units 111 and 118 generate predicted image data from the motion vectors or prediction-related information from the prediction units 108 and 115 by referring to the frame memories 112 and 119 when necessary. The image reproduction units 111 and 118 finally generate reproduced image data from the resulting predicted image data and the reproduced prediction errors, and output the reproduced image data. Coefficient coding units 110 and 117 code the quantization coefficients output from the transform and quantization units 109 and 116 to generate quantization coefficient code data.

A motion vector coding apparatus 100 according to the first exemplary embodiment of the present invention includes motion vector storage units 101 and 104 which store motion vectors in units of blocks. The motion vector storage unit 104 stores motion vectors generated by the prediction unit 108. The motion vector storage unit 101 stores motion vectors generated by the prediction unit 115. Motion vector coding units 1102 and 105 code motion vectors in blocks generated by the prediction units 108 and 115 to generate motion vector code data. A motion vector magnification unit 103 magnifies a motion vector according to the magnification of the magnification unit 113. A magnification unit 120 magnifies the image data from the frame memory 119 by a reciprocal of the magnification of the magnification unit 113, i.e., m/n.

Integration coding units 121 and 122 generate code data of header information and prediction-related information. The integration coding units 121 and 122 also integrate the motion vector code data generated by the motion vector coding units 102 and 105 with the quantization coefficient code data generated by the coefficient coding units 110 and 117.

The frame memories 114 and 119, the prediction unit 115, the transform and quantization unit 116, the coefficient coding unit 117, the image reproduction unit 118, the motion vector storage unit 101, and the motion vector coding unit 102 code image data of a base layer. The frame memories 107 and 112, the prediction unit 108, the transform and quantization unit 109, the coefficient coding unit 110, the image reproduction unit 111, the motion vector storage unit 104, and the motion vector coding unit 105 code image data of an enhancement layer.

A multiplexing unit 123 multiplexes the code data of the base layer and the code data of the enhancement layer to form a bit stream. A terminal 124 outputs the bit stream generated by the multiplexing unit 123 to outside.

An operation for coding an image performed by the above-described image coding apparatus will be described below. First, an operation for coding image data of the base layer will be described.

A single frame of image data input from the terminal 106 is stored into the frame memory 107. The magnification unit 113 magnifies the image data stored in the frame memory 107 by a predetermined magnification n/m. In the case of spatial scalability, the value of n/m is less than 1. The magnified image data is stored into the frame memory 114. The magnification is input to the magnification unit 120 and the motion vector magnification unit 103.

The prediction unit 115 performs intra prediction or motion compensated inter prediction. In the case of inter prediction, the prediction unit 115 refers to a coded picture stored in the frame memory 119 and the block data of the base layer stored in the frame memory 114 to calculate a motion vector. The calculated motion vector is input to the image reproduction unit 118 and the motion vector storage unit 101. The motion vector storage unit 101 stores the motion vectors in units of blocks.

In addition, the prediction unit 115 generates and inputs a prediction error to the transform and quantization unit 116. The transform and quantization unit 116 generates and inputs a quantization coefficient to the coefficient coding unit 117. The coefficient coding unit 117 performs entropy coding on the quantization coefficient to generate quantization coefficient code data. The entropy coding method is not limited in particular, and Golomb coding, arithmetic coding, and Huffman coding may be used. The quantization coefficient, the motion vector, and prediction-related information are input to the image reproduction unit 118. The image generation unit 118 generates a reproduced image of a block to be coded, and stores the reproduced image into the frame memory 119.

Figure 2:
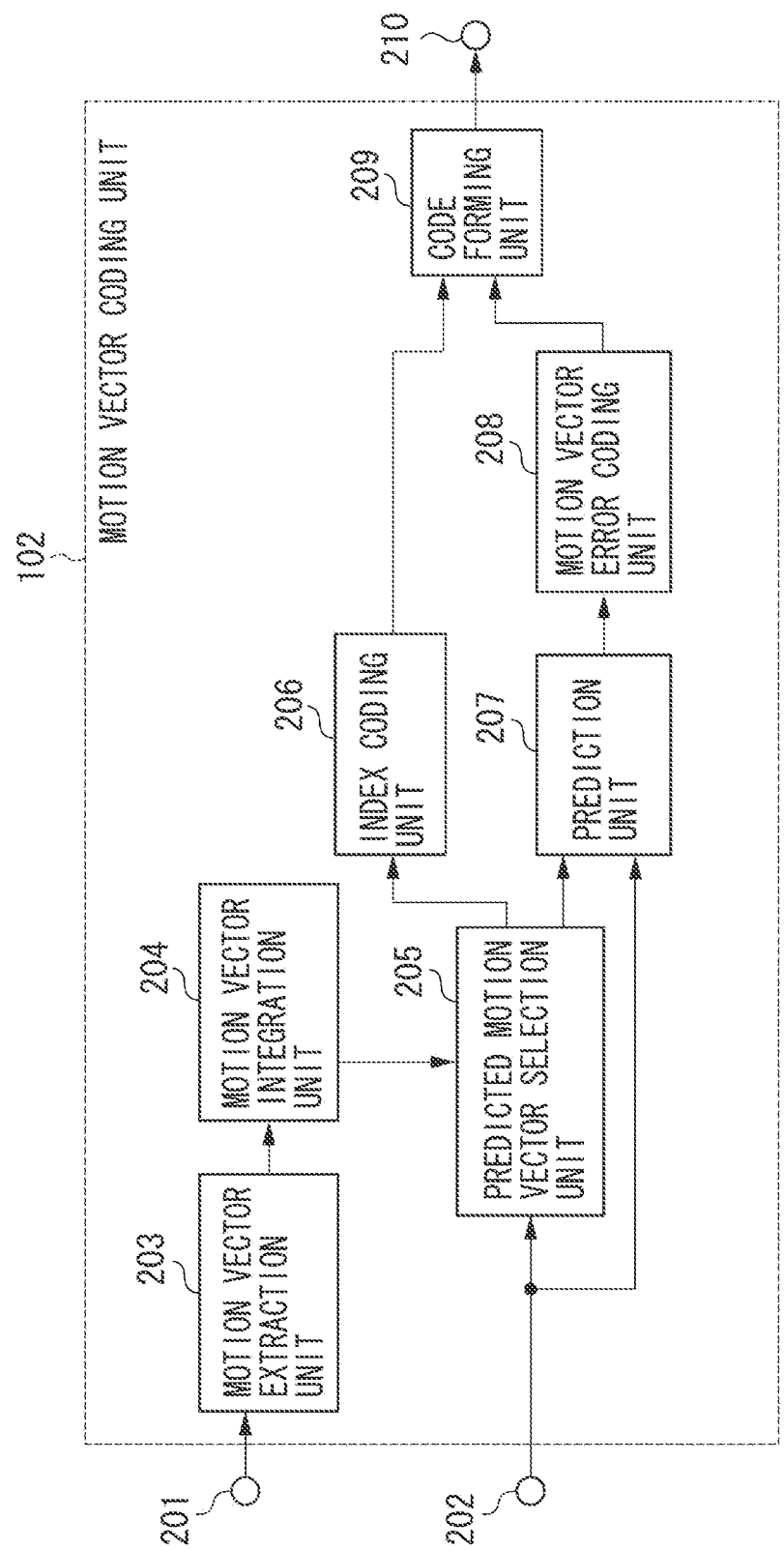
FIG. 2 is a detailed block diagram of a motion vector coding unit 102 in the image coding apparatus according to the first exemplary embodiment.

The motion vector coding unit 102 codes the motion vector generated by the prediction unit 115 to generate motion vector code data. FIG. 2 illustrates a detailed block diagram of the motion vector coding unit 102. In FIG. 2, motion vector from the motion vector storage unit 101 is input to a terminal 201. A terminal 202 receives the motion vector in the block to be coded input from the prediction unit 115. A motion vector extraction unit 203 extracts motion vectors neighboring the block to be coded or a motion vector of a previously coded picture via the terminal 201.

A motion vector integration unit 204 integrates motion vectors including the same components to generate a reference motion vector group. In the reference motion vector group, the integrated motion vectors are arranged in a predetermined order. The arrangement order is not limited in particular, and the integrated motion vectors may be arranged based on the order of the magnitude of the components, the descending order of the probability of occurrence, or the positions of the extracted blocks. Any arrangement method may be used as long as the same method is used on a decoding side.

A predicted motion vector selection unit 205 receives the motion vector in the block to be coded from the terminal 202, and the reference motion vector group from the motion vector integration unit 204 as inputs. The predicted motion vector selection unit 205 selects a motion vector closest to the motion vector in the block to be coded from the input reference motion vector group as a predicted motion vector. The predicted motion vector selection unit 205 outputs an identification number for identifying the selected predicted motion vector in the reference motion vector group, and the selected predicted motion vector. An index coding unit 206 codes the output identification number to generate identification information code data. The method for coding the identification number is not limited in particular, and Golomb coding, arithmetic coding, and Huffman coding may be used.

A prediction unit 207 outputs a prediction error that occurs when the motion vector in the block to be coded is predicted by the input predicted motion vector. A motion vector error coding unit 208 codes the prediction error of the motion vector to generate motion vector prediction error code data. The method for coding the prediction error of the motion vector is not limited in particular, and Golomb coding, arithmetic coding, and Huffman coding may be used. A code forming unit 209 shapes the identification information code data and the motion vector prediction error code data into motion vector code data. A terminal 201 outputs the generated motion vector code data to the integration coding unit 122 in FIG. 1.

An operation for coding a motion vector of a base layer by the above-described configuration will be described below.

The motion vector extraction unit 203 receives motion vectors in neighboring blocks of a block to be coded of the base layer and a temporal direction predicted motion vector via the terminal 201. Such motion vectors are input to the motion vector integration unit 204. The motion vector integration unit 204 compares the components of the motion vectors and integrates the same ones to generate a reference motion vector group.

Figure 6:
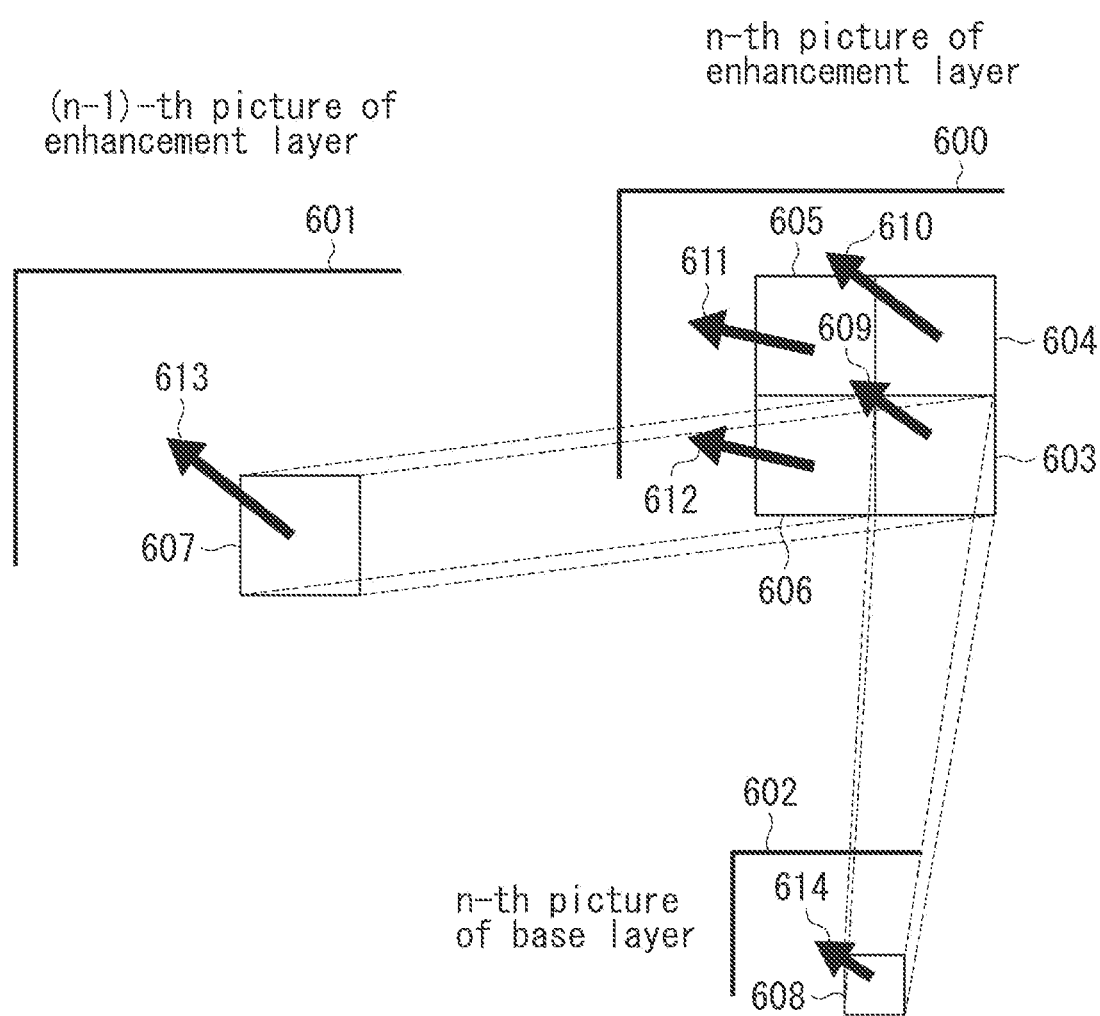
FIG. 6 is a diagram of an example of blocks and motion vectors.

FIG. 6 illustrates how motion vectors are extracted and integrated. An n-th picture 600 of the enhancement layer includes a block 603 to be coded. Blocks 604, 605, and 606 are adjacent to the block 603 to be coded. An (n−1)-th picture 601 of the enhancement layer includes a block 607 that lies at the same position as the block 603. A motion vector 609 is included in the block 603 to be coded. Motion vectors 610, 611, 612, and 613 are included in the respective blocks 604, 605, 606, and 607. Suppose that the motion vectors 611 and 612 have the same components. In such a case, the resulting reference motion vector group includes the motion vectors 613, 612, and 610.

The generated reference motion vector group is input to the predicted motion vector selection unit 205. The predicted motion vector selection unit 205 compares the motion vector in the block to be coded input from the terminal 202 and the motion vectors in the reference motion vector group. The predicted motion vector selection unit 205 selects a motion vector including the closest components to those of the motion vector in the block to be coded from the reference motion vector group as a predicted motion vector. The predicted motion vector selection unit 205 generates an identification number for indicating order to identify the selected motion vector in the reference motion vector group. The index coding unit 206 codes the identification number to generate identification information code data.

The predicted motion vector is input to the prediction unit 207. The prediction unit 207 predicts the motion vector in the block to be coded, calculates a prediction error, and outputs the prediction error to the motion vector error coding unit 208. The motion vector error coding unit 208 codes the prediction error to generate motion vector prediction error code data. The code forming unit 209 shapes the identification information code data and the motion vector prediction error code data, and outputs the resulting motion vector code data from the terminal 210.

Returning to FIG. 1, the generated motion vector code data and the quantization coefficient code data generated by the coefficient coding unit 117 are input to the integration coding unit 122. The integration coding unit 122 generates code data in units of blocks. The generated code data is input to the multiplexing unit 123.

Next, an operation for coding image data of the enhancement layer will be described.

The magnification unit 120 magnifies image data of the base layer, stored in the frame memory 119, by m/n to generate reference image data of the base layer. The prediction unit 108 divides the image data stored in the frame memory 107 into blocks, and performs intra prediction or motion compensated inter prediction block by block. In the case of inter prediction, the prediction unit 108 refers to a coded picture stored in the frame memory 112 and the reference image data of base layer to calculate a motion vector. The calculated motion vector is input to the image reproduction unit 111 and the motion vector storage unit 104. The motion vector storage unit 104 stores the motion vector in units of blocks. In addition, the prediction unit 108 generates and inputs a prediction error to the transform and quantization unit 109. The transform and quantization unit 109 generates and inputs a quantization coefficient to the coefficient coding unit 110. Similar to the coefficient coding unit 117, the coefficient coding unit 110 performs entropy coding on the quantization coefficient to generate quantization coefficient code data. The quantization coefficient, the motion vector, and prediction-related information are input to the image reproduction unit 111. Similar to the image reproduction unit 118, the image reproduction unit 111 generates a reproduced image of a block to be coded, and stores the reproduced image into the frame memory 112.

The motion vector coding unit 105 codes the motion vector generated by the prediction unit 108 to generate motion vector code data. Prior to the coding of a motion vector in the motion vector coding unit 105, the motion vector magnification unit 103 extracts a motion vector at the position of a block of the base layer corresponding to the block to be coded of the enhancement layer from the motion vector storage unit 101. The motion vector magnification unit 103 magnifies the extracted motion vector by m/n according to the magnification (n/m) output from the magnification unit 113, and outputs the resulting interlayer predicted motion vector to the motion vector coding unit 105.

FIG. 6 illustrates how motion vectors are extracted and integrated. An n-th picture 602 of the base layer corresponding to the n-th picture 600 of the enhancement layer. A block 608 lies in a position corresponding to the block 603 to be coded of the enhancement layer. The block 608 of the base layer includes a motion vector 614. The motion vector 614 is magnified into an interlayer predicted motion vector which has the same precision as the resolution of the enhancement layer. Suppose that the motion vectors 611 and 612 and the interlayer predicted motion vector have the same components. In such a case, the resulting reference motion vector group includes the interlayer predicted motion vector and the motion vectors 613 and 610.

Figure 3:
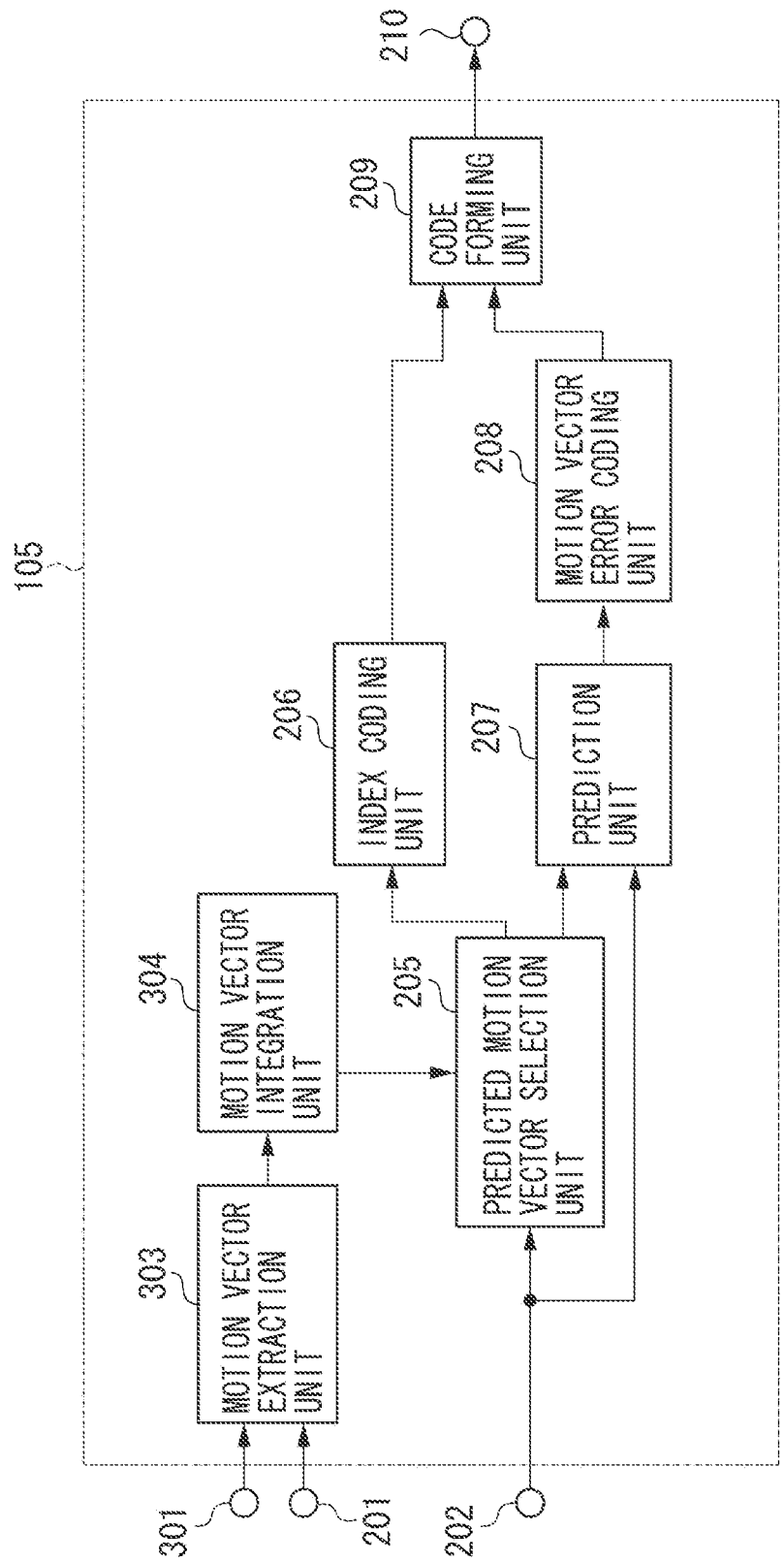
FIG. 3 is a detailed block diagram of a motion vector coding unit 105 in the image coding apparatus according to the first exemplary embodiment.

FIG. 3 illustrates a detailed block diagram of the motion vector coding unit 105. In FIG. 3, blocks implementing similar functions to those of the blocks in FIG. 2 are designated by the same reference numerals. Description thereof will be omitted. A terminal 301 inputs an interlayer predicted motion vector from the motion vector magnification unit 103. A motion vector extraction unit 303 extracts motion vectors neighboring the block to be coded of the enhancement layer or a motion vector of a previously coded picture via the terminal 201, and adds the interlayer predicted motion vector from the terminal 301. A motion vector integration unit 304 integrates motion vectors including the same components to generate a reference motion vector group. In the reference motion vector group, the integrated motion vectors are arranged in a predetermined order. The arrangement order is not limited in particular, whereas the interlayer predicted motion vector is arranged at the top. The rest of the motion vectors may be arranged based on the order of the magnitude of the components, the descending order of the probability of occurrence, or the positions of the extracted blocks. The terminal 201 is connected to the motion vector storage unit 104. The terminal 202 is connected to the prediction unit 108. The terminal 210 is connected to the integration coding unit 121.

An operation for coding a motion vector of an enhancement layer by the above-described configuration will be described below.

The motion vector extraction unit 303 inputs motion vectors in neighboring blocks of the block of the base layer to be coded, a temporal direction predicted motion vector, and an interlayer predicted motion vector. The motion vector integration unit 304 compares the components of such motion vectors and integrates the same ones to generate a reference motion vector group. In the reference motion vector group, the integrated motion vectors are arranged in a predetermined order. The generated reference motion vector group is input to the predicted motion vector selection unit 205. Subsequently, similar to the motion vector coding unit 102 of the base layer, the motion vector in the block to be coded is compared with the motion vectors in the reference motion vector group to select a predicted motion vector. An identification number of the selected predicted motion vector is generated and coded to generate identification information code data. A prediction error of the motion vector in the block to be coded is calculated and coded to generate motion vector prediction error code data. The code forming unit 209 shapes the identification information code data and the motion vector prediction error code data, and outputs the resulting motion vector code data from the terminal 210.

Returning to FIG. 1, the generated motion vector code data and the quantization coefficient code data generated by the coefficient coding unit 110 are input to the integration coding unit 121. The integration coding unit 121 generates code data in units of blocks. The generated code data is input to the multiplexing unit 123.

The multiplexing unit 123 multiplexes such code data according to a predetermined format, and outputs the resulting bit stream from the terminal 124 to outside.

Figure 4:
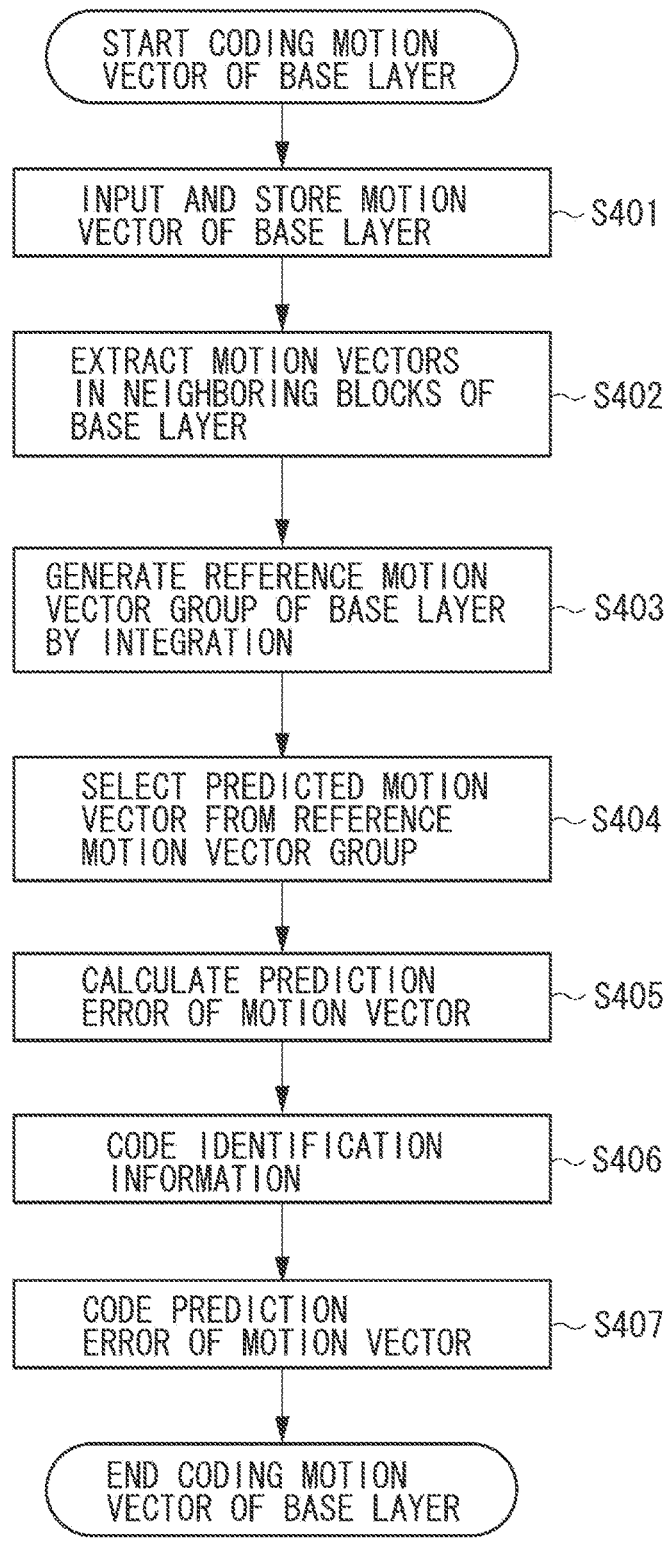
FIG. 4 is a flowchart illustrating processing for coding a motion vector of a base layer by the image coding apparatus according to the first exemplary embodiment.

FIG. 4 is a flowchart illustrating processing for coding a motion vector of a base layer by the image coding apparatus according to the first exemplary embodiment. In step S401, the image coding apparatus inputs a motion vector in a block to be coded of the base layer, and stores the motion vector for reference in subsequent stages. In step S402, the image coding apparatus extracts motion vectors in neighboring blocks of the block to be coded of the base layer or in a block at the same position of a coded picture of the base layer from stored coded motion vectors of the base layer.

In step S403, the image coding apparatus integrates motion vectors including the same components among the motion vectors extracted in step S402. The image coding apparatus rearranges the resultant in a predetermined order to generate a reference motion vector group. In step S404, the image coding apparatus compares the reference motion vector group generated in step S403 with the motion vector in the block to be coded of the base layer to select the closest motion vector as a predicted motion vector of the base layer, and generates identification information.

In step S405, the image coding apparatus calculates a prediction error of the motion vector to be coded using the predicted motion vector. In step S406, the image coding apparatus codes the identification information generated in step S404. In step S407, the image coding apparatus codes the prediction error of the motion vector of the base layer.

Figure 5:
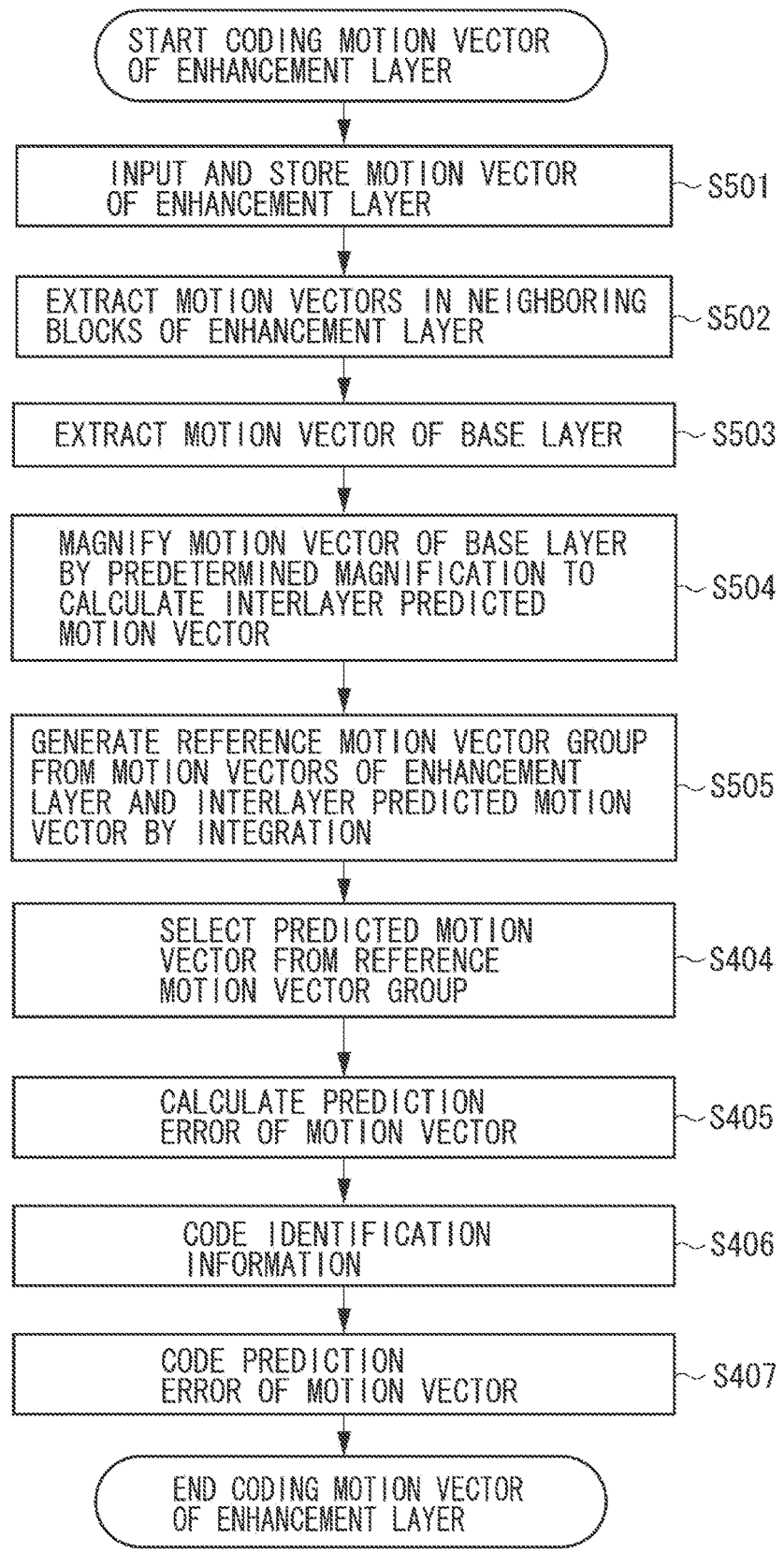
FIG. 5 is a flowchart illustrating processing for coding a motion vector of an enhancement layer by the image coding apparatus according to the first exemplary embodiment.

FIG. 5 is a flowchart illustrating processing for coding a motion vector of an enhancement layer by the image coding apparatus according to the first exemplary embodiment. In FIG. 5, steps for implementing similar functions to those of the steps in FIG. 4 are designated by the same reference numerals. Description thereof will be omitted. In step S501, the image coding apparatus inputs a motion vector in a block to be coded of the enhancement layer, and stores the motion vector for reference in subsequent stages.

In step S502, the image coding apparatus extracts motion vectors in neighboring blocks of the block to be coded of the enhancement layer or in a block at the same position of a coded picture of the enhancement layer from stored motion vectors of the enhancement layer. In step S503, the image coding apparatus extracts a motion vector in a block of the base layer corresponding to the position of the block to be coded of the enhancement layer.

In step S504, the image coding apparatus magnifies the extracted motion vector of the base layer to calculate an interlayer predicted motion vector. In step S505, the image coding apparatus integrates motion vectors including the same components among the motion vectors extracted in step S502 and the interlayer predicted motion vector. The image coding apparatus rearranges the resultant in a predetermined order to generate a reference motion vector group. In subsequent steps S404 to S407, similar to the coding of a motion vector of the base layer in FIG. 4, the image coding apparatus determines a predicted motion vector and generates identification information. The image coding apparatus further calculates a prediction error from the predicted motion vector. The image coding apparatus codes the generated identification information and the prediction error of the motion vector.

According to the above-described configuration and operation, the image coding apparatus can efficiently code the motion vector of the enhancement layer by using the motion vector of the base layer. In the case where the magnification factor is 1, the magnification units 113 and 120 and the motion vector magnification unit 103 may be omitted.

The motion vector integration unit 204 may always allocate an interlayer predicted motion vector to the top of a reference motion vector group. Accordingly, chances for a shorter code to be assigned to an interlayer predicted motion vector which is highly likely to be referred to can be increased, and the coding efficiency can be further improved.

The motion vector extraction unit 203 inputs a motion vector in a block at the same position of a picture in which a temporal direction predicted motion vector is coded. However, this is not restrictive. For example, the input of a temporal direction predicted motion vector may be omitted if there is an interlayer predicted motion vector.

The motion vector integration unit 304 is described to arrange an interlayer predicted motion vector at the top. However, the motion vector integration unit 304 may arrange an interlayer predicted motion vector after a temporal direction predicted motion vector. In addition, similar to the motion vector integration unit 204, the arrangement need not be particularly fixed.

According to the present exemplary embodiment, the motion vector integration units 204 and 304 integrate motion vectors including the same components in order to improve the coding efficiency. However, the motion vector integration units 204 and 304 are not limited to the above configuration. The motion vector integration units 204 and 304 may select a fixed number of motion vectors. The motion vector integration units 204 and 304 may even be omitted.

A base layer coding apparatus and an enhancement layer coding apparatus may be provided separately, and the magnification units 113 and 120 may be provided outside of the image coding apparatus.

Figure 16:
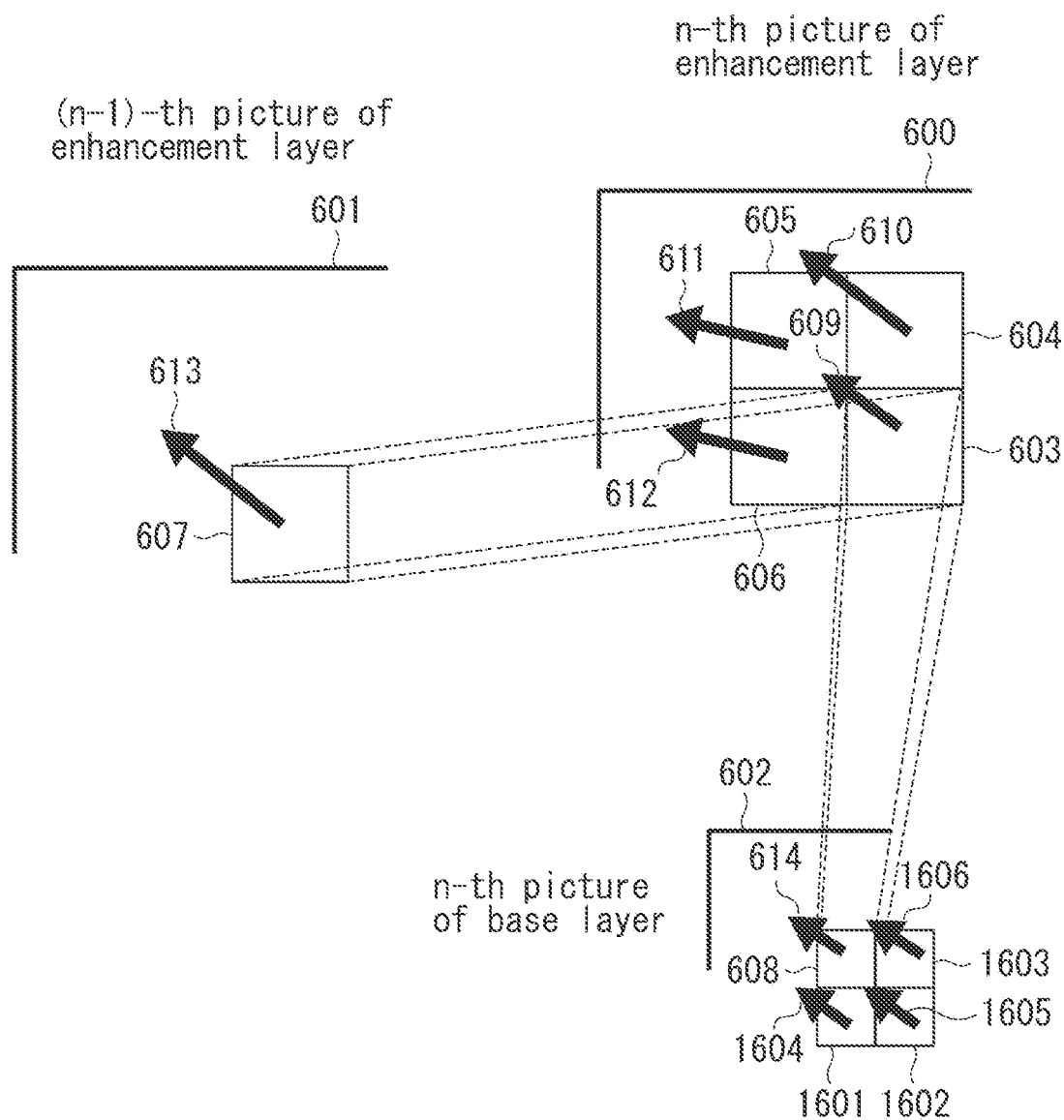
FIG. 16 is a diagram of an example of blocks and motion vectors.

The blocks lying in the positions illustrated in FIG. 6 are referred to for the motion vectors of the reference motion vector group. However, the blocks and the motion vectors are not limited to this example. For example, a motion vector in a block adjacent to the right of the block 604 may be added. A motion vector corresponding to a median value of such motion vectors may be added. The motion vector to be referred to in the base layer is not limited to that of the same position, either. As illustrated in FIG. 16, a motion vector 1604 in a block 1601 below the block 608, a motion vector 1605 in a block 1602 on the lower right, and a motion vector 1606 in a block 1603 on the right may be referred to. Motion vectors in other blocks may also be referred to.

Figure 7:
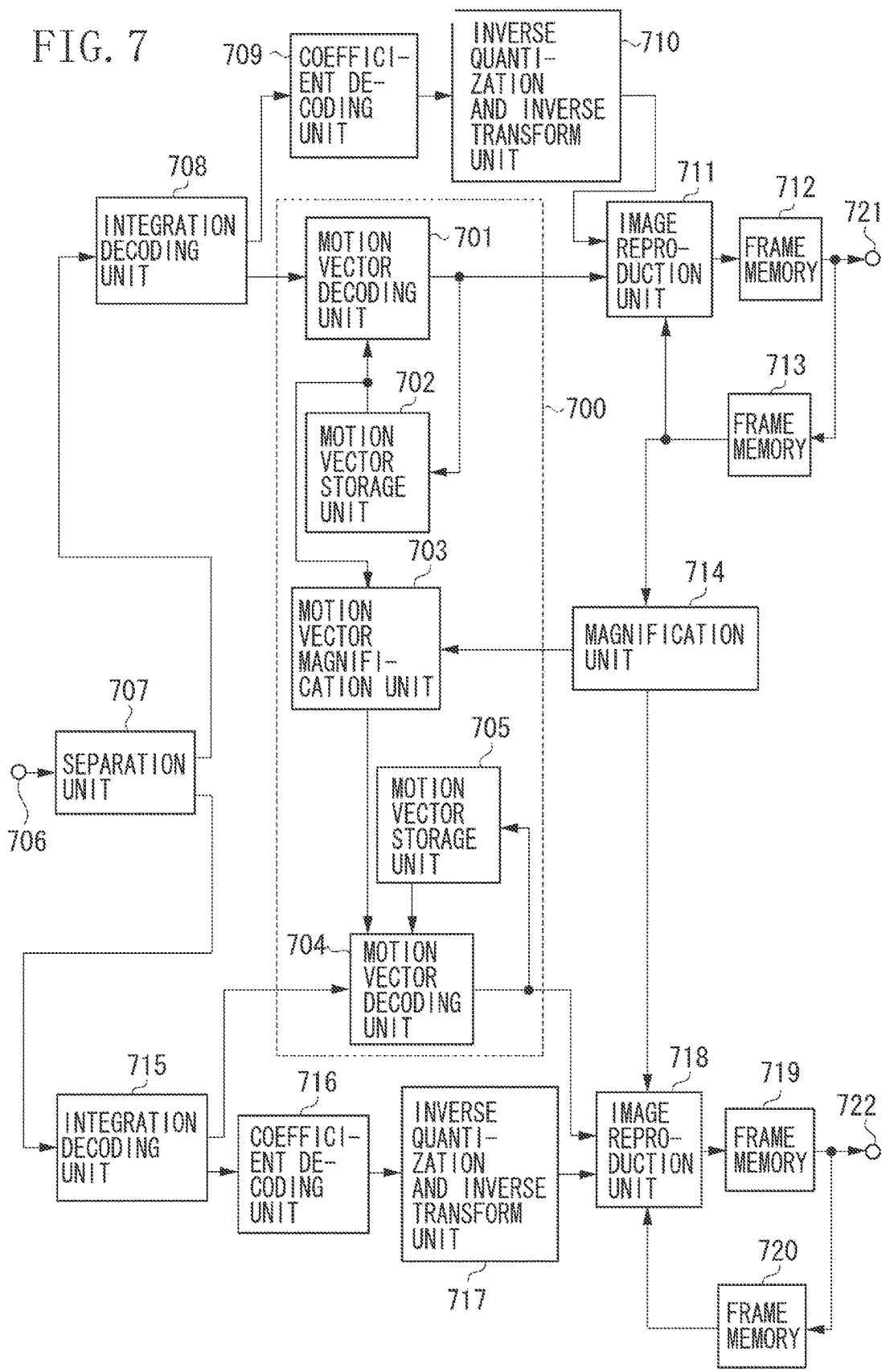
FIG. 7 is a block diagram illustrating a configuration of an image decoding apparatus according to a second exemplary embodiment.

FIG. 7 is a block diagram illustrating a configuration of an image decoding apparatus according to a second exemplary embodiment of the present invention. The present exemplary embodiment will be described using the decoding of code data generated in the first exemplary embodiment as an example.

A terminal 706 inputs a coded bit stream. A separation unit 707 separates the bit stream into code data of the base layer and code data of the enhancement layer. The separation unit 707 performs an operation reverse to that of the multiplexing unit 123 in FIG. 1. Integration decoding units 708 and 715 decode code data on header information and prediction-related information about the base layer and the enhancement layer. The integration decoding units 708 and 715 separate quantization coefficient code data and motion vector code data, and output the resultant to subsequent stages. Coefficient decoding units 709 and 716 perform an operation reverse to that of the coefficient coding units 117 and 110 in FIG. 1 to reproduce quantization coefficients. Inverse quantization and inverse transform units 710 and 717 perform an operation reverse to that of the transform and quantization units 116 and 109 in FIG. 1. The inverse quantization and inverse transform units 710 and 717 reproduce orthogonal transform coefficients by inverse quantization, and generate prediction errors by inverse orthogonal transform.

A motion vector decoding apparatus 700 according to the present exemplary embodiment of the present invention includes vector decoding units 701 and 704. The motion vector decoding units 701 and 704 decode motion vector code data to reproduce motion vectors in blocks to be decoded. Motion vector storage units 702 and 705 store the motion vectors in units of blocks. A motion vector magnification unit 703 magnifies a motion vector according to the same magnification as that of the magnification unit 113 in FIG. 11. The method for calculating the magnification is not limited in particular. The ratio between the resolution of the base layer and that of the enhancement layer may be calculated. A predetermined value may be set.

Frame memories 712, 713, 719, and 720 store image data of reproduced pictures.

Image reproduction units 711 and 718 input the motion vectors, refer to image data on decoded pictures, perform motion compensation, and reproduce image data using the decoded prediction errors. A magnification unit 714 magnifies the image data of the base layer according to the same magnification as that of the magnification unit 113 in FIG. 1. The method for calculating the magnification is not limited in particular. The ratio between the resolution of the base layer and that of the enhancement layer may be calculated. A predetermined value may be set. A terminal 721 outputs the image data of the base layer. A terminal 722 outputs the image data of the enhancement layer.

The integration decoding unit 708, the coefficient decoding unit 708, the inverse quantization and inverse transform unit 710, the motion vector decoding unit 701, the motion vector storage unit 702, the image reproduction unit 711, and the frame memories 712 and 713 decode the code data of the base layer and reproduce the image data of the base layer. The integration decoding unit 715, the coefficient decoding unit 716, the inverse quantization and inverse transform unit 717, the motion vector decoding unit 704, the motion vector storage unit 705, the image reproduction unit 718, and the frame memories 719 and 720 decode the code data of the enhancement layer and reproduce the image data of the enhancement layer.

An operation for decoding an image by the above-described image decoding apparatus will be described below. In the present exemplary embodiment, the image decoding apparatus decodes a bit stream generated in the first exemplary embodiment.

In FIG. 7, the bit stream input from the terminal 706 is input to the separation unit 707. The separation unit 707 separates the bit stream into code data of the base layer and code data of the enhancement layer. The former is input to the integration decoding unit 708. The latter is input to the integration decoding unit 715.

First, an operation for decoding the code data of the base layer will be described. The code data of the base layer is input to the integration decoding unit 708. The integration decoding unit 708 decodes the code data on header information and prediction-related information, separates quantization coefficient code data and motion vector code data, inputs the motion vector code data to the motion vector decoding unit 701, and inputs the quantization coefficient code data to the coefficient decoding unit 709.

The coefficient decoding unit 709 decodes the quantization coefficient code data to reproduce a quantization coefficient. The reproduced quantization coefficient is input to the inverse quantization and inverse transform unit 710. The inverse quantization and inverse transform unit 710 performs inverse quantization on the reproduced quantization coefficient to generate an orthogonal transform coefficient, and further applies inverse orthogonal transform thereto to reproduce a prediction error. The reproduced prediction error is input to the image reproduction unit 711.

Figure 8:
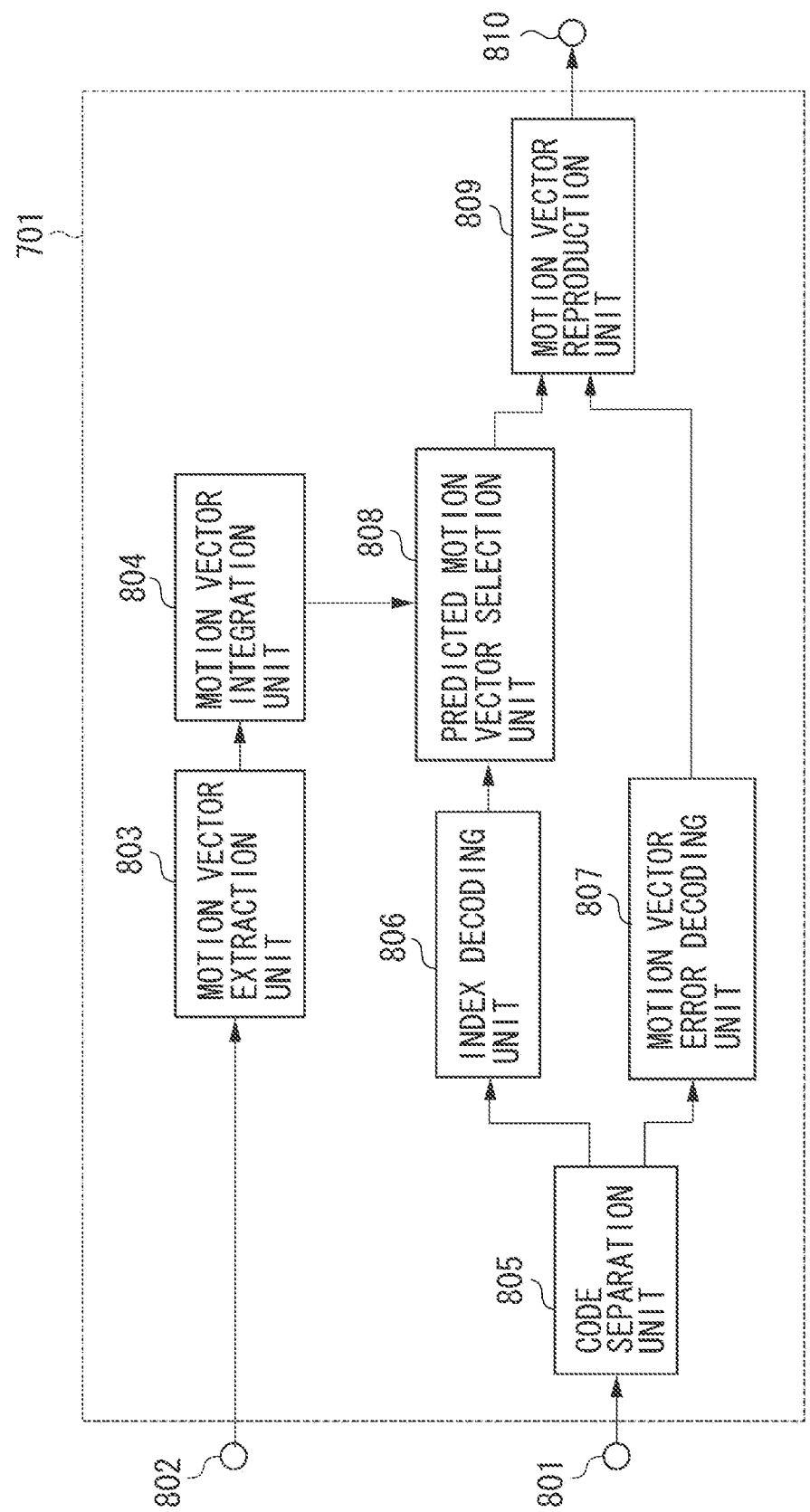
FIG. 8 is a detailed block diagram of a motion vector decoding unit 701 according to the second exemplary embodiment.

The motion vector decoding unit 701 decodes the motion vector code data to reproduce a motion vector in a block to be decoded of the base layer. FIG. 8 illustrates a detailed block diagram of the motion vector decoding unit 701. In FIG. 8, a terminal 801 inputs the motion vector code data of the block to be decoded from the integration decoding unit 708. A terminal 802 inputs a motion vector from the motion vector storage unit 702. A motion vector extraction unit 803 extracts motion vectors neighboring the block to be decoded of the base layer or a motion vector of a previously decoded picture via the terminal 802.

A motion vector integration unit 804 performs a similar operation to that of the motion vector integration unit 204 in FIG. 2. That is, the motion vector integration unit 804 integrates motion vectors including the same components to generate a reference motion vector group. A code separation unit 805 separates the motion vector code data into identification information code data and motion vector prediction error code data. An index decoding unit 806 decodes the identification information code data to reproduce identification information. The index decoding unit 806 performs an operation reverse to that of the index coding unit 206 in FIG. 2 for decoding.

A motion vector error decoding unit 807 decodes the motion vector prediction error code data to reproduce the prediction error of the motion vector in the block to be decoded. The motion vector error decoding unit 807 performs an operation reverse to that of the motion vector error coding unit 208 in FIG. 2 for decoding. A predicted motion vector selection unit 808 selects a predicted motion vector from the reference motion vector group using the reproduced identification information. A motion vector reproduction unit 809 reproduces the motion vector in the block to be decoded of the base layer from the selected predicted motion vector and the reproduced prediction error of the motion vector. A terminal 810 outputs the reproduced motion vector to the image reproduction unit 711 and the motion vector storage unit 702 in FIG. 7.

An operation for decoding a motion vector of the base layer by the above-described configuration will be described below. The motion vector code data of the block to be decoded of the base layer input from the terminal 801 is input to the code separation unit 805. The code separation unit 805 separates the motion vector code data into identification information code data and motion vector prediction error code data. The former is input to the index decoding unit 806. The latter is input to the motion vector error decoding unit 807.

The index decoding unit 806 decodes the identification information code data to reproduce identification information. The motion vector error decoding unit 807 decodes the motion vector prediction error code data to reproduce the prediction error of the motion vector in the block to be decoded of the base layer. As illustrated in FIG. 6, the motion vector extraction unit 803 extracts the motion vectors in the neighboring blocks of the block of the base layer to be decoded and the temporal direction predicted motion vector from the motion vector storage unit 702 via the terminal 802. The extracted motion vectors are input to the motion vector integration unit 804. The motion vector integration unit 804 generates a reference motion vector group similar to the motion vector integration unit 204 in FIG. 2.

The predicted motion vector selection unit 808 inputs the identification information from the index decoding unit 806 and selects a predicted motion vector from the reference motion vector group. The selected predicted motion vector is input to the motion vector generation unit 809 together with the reproduced prediction error of the motion vector in the block to be decoded of the base layer. The motion vector reproduction unit 809 reproduces the motion vector in the block to be decoded from the reproduced prediction error and the predicted motion vector. The reproduced motion vector is output via the terminal 810.

Returning to FIG. 7, the reproduced motion vector is input to the image reproduction unit 711 and the motion vector storage unit 702. The motion vector storage unit 702 stores motion vectors in units of blocks. The image reproduction unit 711 calculates predicted image data of the block to be decoded of the base layer using the reproduced motion vector and based on the frame memory 713. The image reproduction unit 711 further is input the prediction error reproduced by the inverse quantization and inverse transform unit 710, and reproduces image data of the base layer using the predicted image data. The reproduced image data of the base layer is stored into the frame memories 712 and 713 and used for reference. The reproduced image data of the base layer is output from the terminal 721.

Next, an operation for decoding code data of the enhancement layer will be described. Prior to the decoding of a motion vector by the motion vector decoding unit 704, the motion vector magnification unit 703 extracts a motion vector at the position of a block of the base layer corresponding to the block to be decoded of the enhancement layer from the motion vector storage unit 702. The motion vector magnification unit 703 magnifies the extracted motion vector by m/n according to the magnification (n/m), and outputs the resulting interlayer predicted motion vector to the motion vector decoding unit 704.

The code data of the enhancement layer is input to the integration decoding unit 715. The integration decoding unit 715 decodes the code data on header information and prediction-related information, separates quantization coefficient code data and motion vector code data, inputs the motion vector code data to the motion vector decoding unit 704, and inputs the quantization coefficient code data to the coefficient decoding unit 716.

The coefficient decoding unit 716 decodes the quantization coefficient code data to reproduce a quantization coefficient. The reproduced quantization coefficient is input to the inverse quantization and inverse transform unit 717. The inverse quantization and inverse transform unit 717 performs inverse quantization on the reproduced quantization coefficient to generate an orthogonal transform coefficient, and further applies inverse orthogonal transform thereto to reproduce a prediction error. The reproduced prediction error is input to the image reproduction unit 718.

Figure 9:
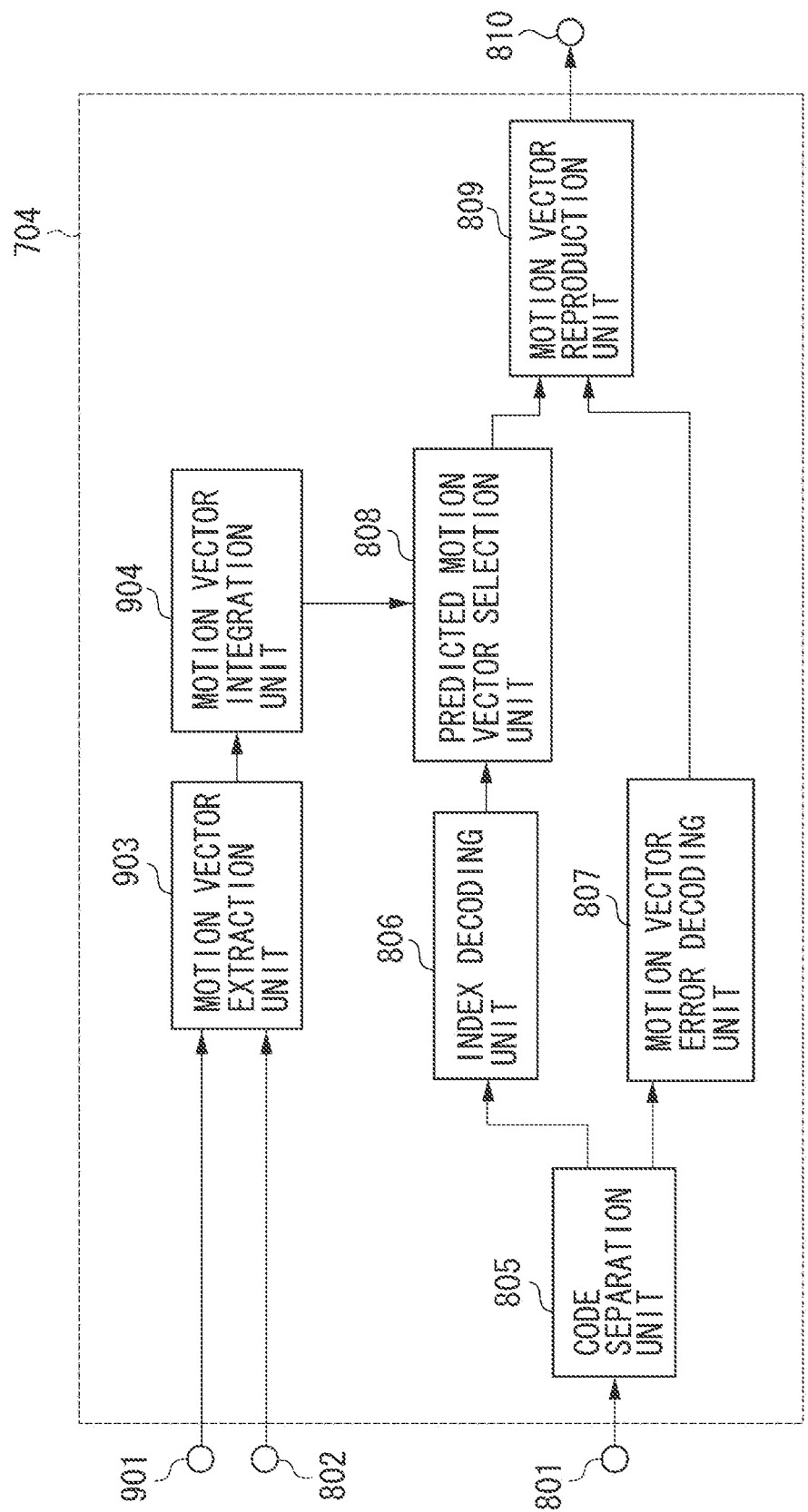
FIG. 9 is a detailed block diagram of a motion vector decoding unit 704 according to the second exemplary embodiment.

The motion vector decoding unit 704 decodes the motion vector code data to reproduce the motion vector in the block to be decoded of the enhancement layer. FIG. 9 illustrates a detailed block diagram of the motion vector decoding unit 704. In FIG. 9, blocks implementing similar functions to those of the blocks in FIG. 8 are designated by the same reference numerals. Description thereof will be omitted. In FIG. 9, a terminal 901 inputs a motion vector from the motion vector magnification unit 703. A motion vector extraction unit 903 is input motion vectors neighboring the block to be decoded of the enhancement layer or a motion vector of a previously decoded picture as illustrated in FIG. 6 via the terminal 901. The motion vector extraction unit 903 is also input the interlayer predicted motion vector input from the terminal 901. A motion vector integration unit 904 performs a similar operation to that of the motion vector integration unit 804 in FIG. 8. That is, the motion vector integration unit 904 integrates motion vectors including the same components to generate a reference motion vector group.

In the reference motion vector group, the integrated motion vectors are arranged in a predetermined order. The arrangement order is not limited in particular, whereas the interlayer predicted motion vector is arranged at the top. The rest of the motion vectors may be arranged based on the order of the magnitude of the components, the descending order of the probability of occurrence, or the positions of the extracted blocks. A terminal 801 is connected to the integration decoding unit 715. A terminal 802 is connected to the motion vector storage unit 705. A terminal 810 is connected to the motion vector storage unit 705 and the image reproduction unit 718.

An operation for decoding a motion vector of the enhancement layer by the above-described configuration will be described. The motion vector extraction unit 903 is input motion vectors in neighboring blocks of the block to be decoded of the enhancement layer and a temporal direction predicted motion vector from the motion vector storage unit 705 via the terminal 802. The motion vector extraction unit 903 is further input an interlayer predicted motion vector from the terminal 901. Such motion vectors are input to the motion vector integration unit 904. The motion vector integration unit 904 generates a reference motion vector group similar to the motion vector integration unit 804 in FIG. 8. Subsequently, similar to the motion vector decoding unit 701 of the base layer, the motion vector decoding unit 704 selects a predicted motion vector from the reference motion vector group based on the identification information. The motion vector decoding unit 704 reproduces the motion vector in the block to be decoded of the enhancement layer using the selected predicted motion vector and the reproduced prediction error of the motion vector in the block to be decoded of the enhancement layer. The reproduced motion vector is output via the terminal 810.

Returning to FIG. 7, the reproduced motion vector is input to the image reproduction unit 718 and the motion vector storage unit 705. The motion vector storage unit 705 stores motion vectors in units of blocks. The image reproduction unit 718 is input the image data magnified by the magnification unit 714 by reading corresponding image data from the frame memory 713 or the image data by reading the frame memory 713 using the reproduced motion vector. The image reproduction unit 718 calculates predicted image data of the block to be decoded of the enhancement layer from the image data. The image reproduction unit 718 is further inputs the prediction error reproduced by the inverse quantization and inverse transform unit 717, and reproduces image data of the enhancement layer using the predicted image data. The reproduced image data of the enhancement layer is stored in the frame memories 719 and 720 and used for reference. The reproduced image data of the enhancement layer is output from the terminal 722.

Figure 10:
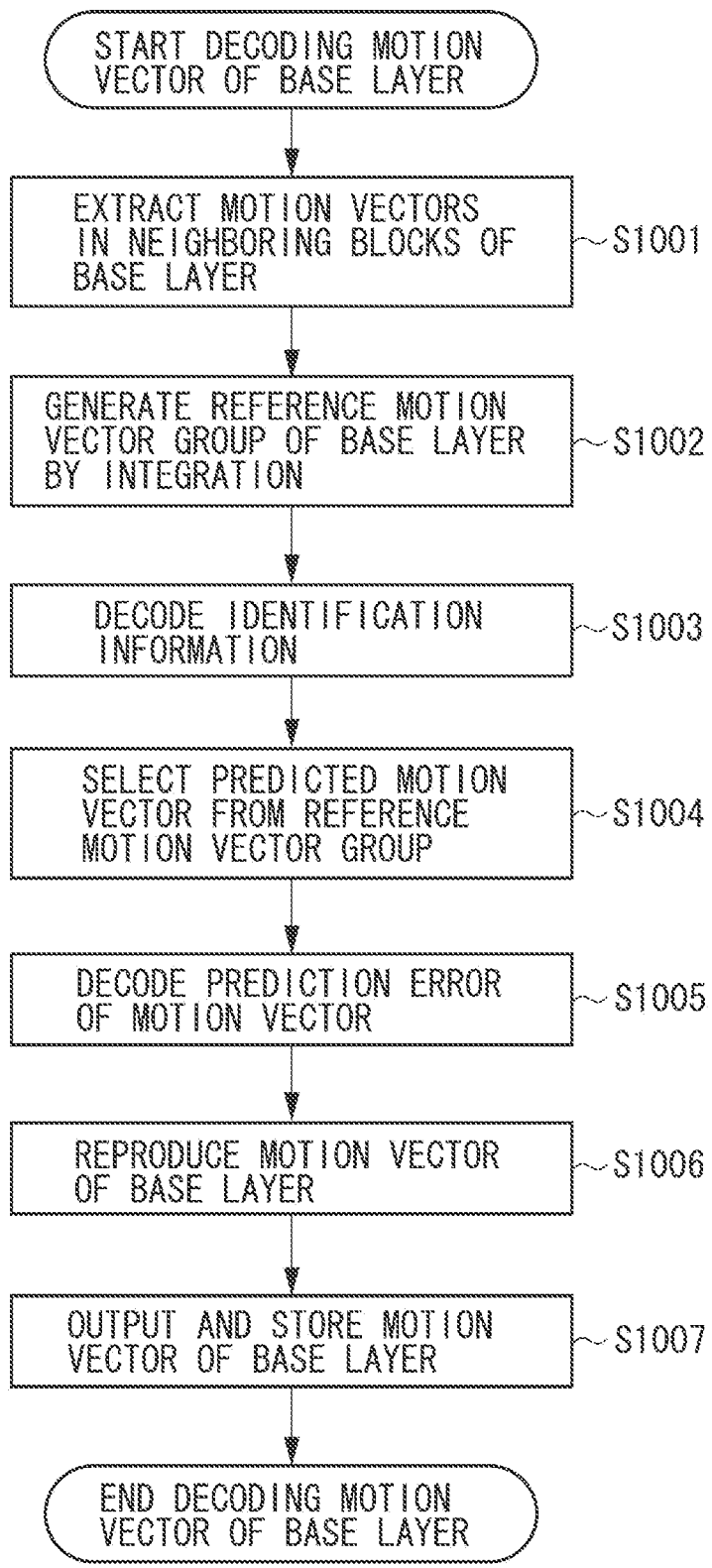
FIG. 10 is a flowchart illustrating processing for decoding a motion vector of a base layer by the image decoding apparatus according to the second exemplary embodiment.

FIG. 10 is a flowchart illustrating processing for decoding a motion vector of the base layer by the image decoding apparatus according to the second exemplary embodiment. In step S1001, the image decoding apparatus extracts motion vectors in neighboring blocks of the block to be decoded of the base layer and a temporal direction predicted motion vector from stored motion vectors. In step S1002, the image decoding apparatus integrates motion vectors including the same components among the motion vectors extracted in step S1001, and rearranges the resultant in a predetermined order to generate a reference motion vector group.

In step S1003, the image decoding apparatus decodes identification information code data to reproduce identification information. In step S1004, the image decoding apparatus selects a predicted motion vector from the reference motion vector group generated in step S1002 based on the identification information reproduced in step S1003. In step S1005, the image decoding apparatus decodes motion vector prediction error code data to reproduce the prediction error of the motion vector in the block to be decoded of the base layer.

In step S1006, the image decoding apparatus reproduces the motion vector in the block to be decoded of the base layer from the predicted motion vector selected in step S1004 and the prediction error of the motion vector reproduced in step S1005. In step S1007, the image decoding apparatus outputs the reproduced motion vector, and stores the motion vector for reference in subsequent stages.

Figure 11:
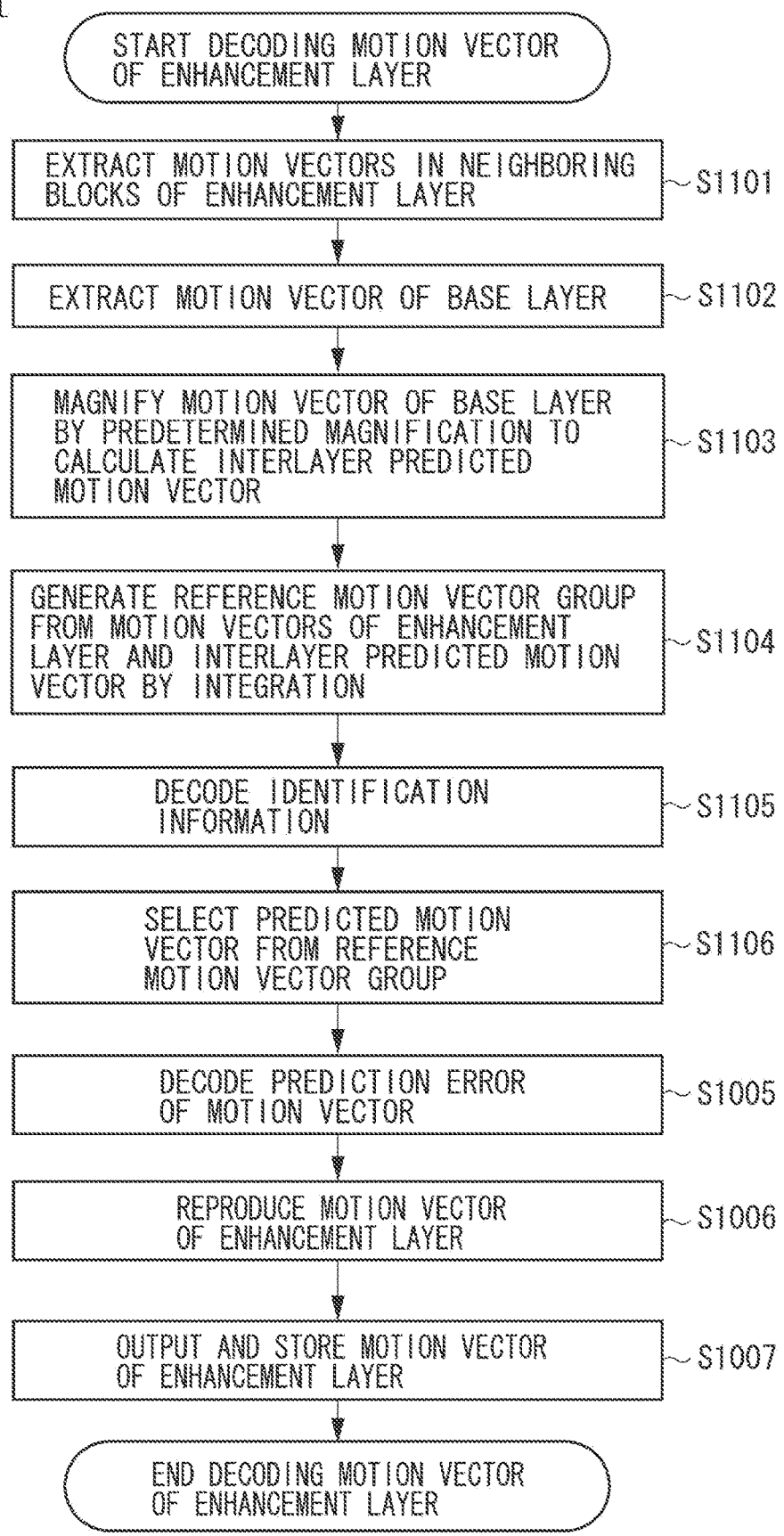
FIG. 11 is a flowchart illustrating processing for decoding a motion vector of an enhancement layer by the image decoding apparatus according to the second exemplary embodiment.

FIG. 11 is a flowchart illustrating processing for decoding a motion vector of the enhancement layer by the image decoding apparatus according to the second exemplary embodiment. In FIG. 11, steps for implementing similar functions to those of the steps in FIG. 10 are designated by the same reference numerals. Description thereof will be omitted.

In step S1101, the image decoding apparatus extracts motion vectors in neighboring blocks of the block to be decoded of the enhancement layer or a temporal direction predicted motion vector of the enhancement layer from stored decoded motion vectors of the enhancement layer. In step S1102, the image decoding apparatus extracts a motion vector in a block of the base layer corresponding to the position of the block to be decoded of the enhancement layer. In step S1103, the image decoding apparatus magnifies the extracted motion vector of the base layer to calculate an interlayer predicted motion vector. In step S1104, the image decoding apparatus integrates motion vectors including the same components among the motion vectors extracted in step S1102 and the interlayer predicted motion vector, and rearranges the resultant in a predetermined order to generate a reference motion vector group.

In step S1105, the image decoding apparatus decodes identification information code data to reproduce identification information. In step S1106, the image decoding apparatus selects a predicted motion vector from the reference motion vector group generated in step S1104 based on the reproduced identification information. Subsequently, similar to the decoding of the motion vector of the base layer in FIG. 10, the image decoding apparatus decodes motion vector prediction error code data to reproduce the prediction error of the motion vector. The image decoding apparatus reproduces the motion vector in the block to be decoded of the enhancement layer from the selected predicted motion vector and the prediction error of the motion vector. The image decoding apparatus outputs and stores the reproduced motion vector.

According to the above-described configuration and operation, a bit stream which is generated in the first exemplary embodiment and efficiently coded using the motion vectors of the base layer can be decoded to obtain a reproduced image. In the case where the magnification factor is 1, the magnification unit 714 and the motion vector magnification unit 703 may be omitted.

The motion vector integration unit 904 may always allocate an interlayer predicted motion vector to the top of a reference motion vector group. Accordingly, chances for a shorter code to be assigned to an interlayer predicted motion vector which is highly likely to be referred to can be increased, and the decoding efficiency can be further improved.

The motion vector extraction unit 903 inputs a temporal direction predicted motion vector. However, this is not restrictive. For example, the input of a temporal direction predicted motion vector may be omitted if there is an interlayer predicted motion vector.

The motion vector integration unit 904 is described to arrange an interlayer predicted motion vector at the top. However, the motion vector integration unit 904 may arrange the interlayer predicted motion vector after a temporal direction predicted motion vector. In addition, similar to the motion vector integration unit 204, the arrangement need not be particularly fixed.

In the present exemplary embodiment, the magnification is input from the motion vector magnification unit 703. However, the input of the magnification is not limited to this example. The ratio between the resolution of the base layer and that of the enhancement layer may be independently calculated. A predetermined value may be set.

According to the present exemplary embodiment, the motion vector integration units 804 and 904 integrate motion vectors including the same components in order to improve the coding efficiency of coded data. However, the motion vector integration units 804 and 904 are not limited to this configuration. The motion vector integration units 804 and 904 may select a fixed number of motion vectors. The motion vector integration units 804 and 904 may even be omitted.

A base layer decoding apparatus and an enhancement layer decoding apparatus may be provided separately, and the magnification unit 714 may be provided outside of the image decoding apparatus. The blocks lying in the positions illustrated in FIG. 6 are referred to for the motion vectors of the reference motion vector group. However, the blocks and the motion vectors are not limited to this example. For example, a motion vector in a block adjacent to the right of the block 604 may be added. A motion vector corresponding to a median value of such motion vectors may be added. The motion vector to be referred to in the base layer is not limited to that of the same position, either. As illustrated in FIG. 16, a motion vector 1604 in a block 1601 below the block 608, a motion vector 1605 in a block 1602 on the lower right, and a motion vector 1606 in a block 1603 on the right may be referred to. Motion vectors in other blocks may also be referred to.

An image coding apparatus according to a third exemplary embodiment includes a similar configuration to that in FIG. 1 according to the first exemplary embodiment. A difference lies in the configuration of the motion vector coding unit 105 of the enhancement layer. Thus, the coding of the base layer and the coding of the quantization coefficient of the enhancement layer are the same as in the first exemplary embodiment, and description thereof will be omitted.

Figure 12:
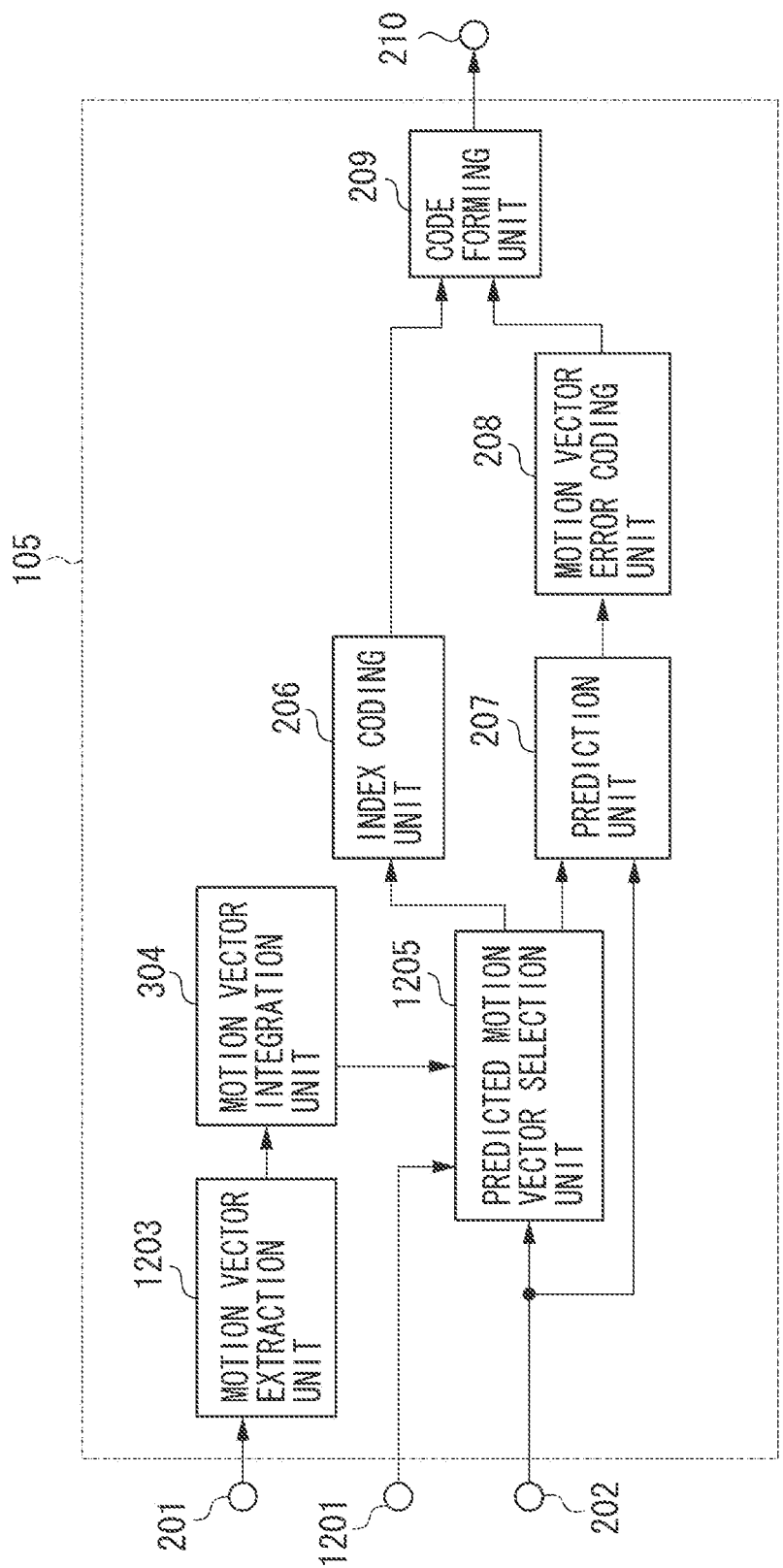
FIG. 12 is a detailed block diagram of a motion vector coding unit 105 in an image coding apparatus according to a third exemplary embodiment.

FIG. 12 is a block diagram illustrating a detailed configuration of the motion vector coding unit 105 according to the present exemplary embodiment. In FIG. 12, parts implementing similar functions to those in FIG. 3 according to the first exemplary embodiment are designated by the same reference numerals. Description thereof will be omitted. Similar to the terminal 301 in FIG. 3, a terminal 1201 inputs an interlayer predicted motion vector from the motion vector magnification unit 103. A motion vector extraction unit 1203 extracts motion vectors neighboring the block to be coded of the enhancement layer or a motion vector of a previously coded picture which are input from the terminal 201. A predicted motion vector selection unit 1205 is input a motion vector in the block to be coded of the enhancement layer from the terminal 202, a reference motion vector group from the motion vector integration unit 304, and the interlayer predicted motion vector from the terminal 1201. The predicted motion vector selection unit 1205 selects a motion vector closest to the motion vector in the block to be coded from the input reference motion vector group as a predicted motion vector.

An operation for coding a motion vector of the enhancement layer by the above-described configuration will be described.

The motion vector extraction unit 1203 extracts the motion vectors neighboring the block to be coded of the enhancement layer or the motion vector of the previously coded picture illustrated in FIG. 6. The extracted motion vector is input to the motion vector integration unit 304. Similar to the first exemplary embodiment, the motion vector integration unit 304 integrates motion vectors including the same components among the input motion vectors to generate a reference motion vector group. The predicted motion vector selection unit 1205 selects a motion vector most similar to the motion vector in the block to be coded from the input reference motion vector group and the interlayer predicted motion vector as a predicted motion vector. The predicted motion vector selection unit 1205 outputs identification information for identifying the selected predicted motion vector, and the predicted motion vector.

A difference from the first exemplary embodiment lies in that the interlayer predicted motion vector is handled as a selection candidate independent of the reference motion vector group. The reference motion vector group may thus include a motion vector including the same components as those of the interlayer predicted motion vector. Therefore, the predicted motion vector selection unit 1205 is configured to select the interlayer predicted motion vector as a predicted motion vector if both the interlayer predicted motion vector and the motion vector in the reference motion vector group can be selected.

Subsequently, similar to the first exemplary embodiment, the index coding unit 206 codes identification information. The prediction unit 207 calculates a prediction error from the motion vector in the block to be coded and the predicted motion vector. The motion vector error coding unit 208 codes the prediction error.

Figure 13:
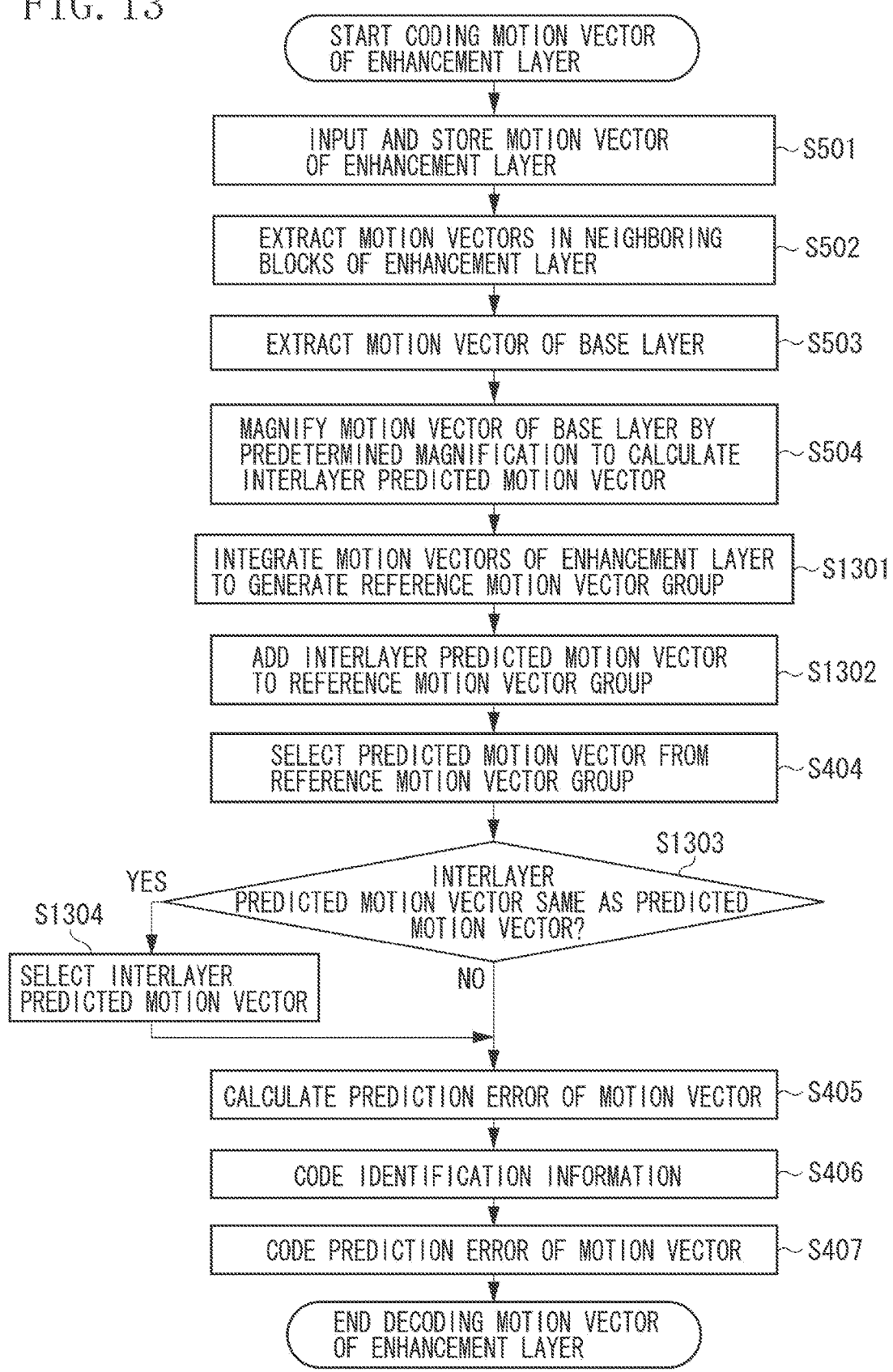
FIG. 13 is a flowchart illustrating processing for coding a motion vector of an enhancement layer by the image coding apparatus according to the third exemplary embodiment.

FIG. 13 is a flowchart illustrating processing for coding a motion vector of the enhancement layer by the image coding apparatus according to the third exemplary embodiment. In FIG. 13, steps for implementing similar functions to those of the steps in FIG. 5 are designated by the same reference numerals. Description thereof will be omitted.

Processing in steps S501 to S504 are similar to those of the first exemplary embodiment. More specifically, the image coding apparatus extracts motion vectors neighboring the block to be coded of the enhancement layer or a moving vector in a block at the same position of a coded picture of the enhancement layer from stored motion vectors of the enhancement layer, and calculates an interlayer predicted motion vector. In step S1301, the image coding apparatus integrates motion vectors including the same components among the motion vectors neighboring the block to be coded of the enhancement layer or the motion vector of the previously coded picture, and rearranges the resultant in a predetermined order to generate a reference motion vector group. In step S1302, the image coding apparatus adds the interlayer predicted motion vector to the top of the generated reference motion vector group.

In step S404, the image coding apparatus selects a predicted motion vector from the reference motion vector group similar to the first exemplary embodiment. In step S1303, if the predicted motion vector includes the same components as those of the interlayer predicted motion vector (YES in step S1303), the processing proceeds to step S1304. Whereas if not (NO in step S1303), the processing proceeds to step S405. In step S1304, the image coding apparatus selects the interlayer predicted motion vector as a predicted motion vector. Accordingly, the other motion vector including the same components may be prevented from being selected. In steps S405 to S407, similar to the processing for coding the motion vector of the enhancement layer in FIG. 5 according to the first exemplary embodiment, the image coding apparatus calculates the prediction error of the motion vector, codes the identification information, and codes the prediction error of the motion vector.

According to the above-described configuration and operation, the image coding apparatus can efficiently code the motion vector of the enhancement layer by preferentially using the motion vector of the base layer over other motion vectors. This is because the interlayer predicted motion vector has extremely highly correlation with the motion vector in the block of the enhancement layer.

The blocks lying in the positions illustrated in FIG. 6 are referred to for the motion vectors of the reference motion vector group. However, the blocks and the motion vectors are not limited to this example. For example, a motion vector in a block adjacent to the right of the block 604 may be added. A motion vector corresponding to a median value of such motion vectors may be added.

According to the present exemplary embodiment, the motion vector integration units 204 and 304 integrate motion vectors including the same components in order to improve the coding efficiency. However, the motion vector integration units 204 and 304 are not limited to the above configuration. The motion vector integration units 204 and 304 may select a fixed number of motion vectors. The motion vector integration units 204 and 304 may even be omitted.

An image decoding apparatus according to a fourth exemplary embodiment includes a similar configuration to that in FIG. 7 according to the second exemplary embodiment. A difference lies in the configuration of the motion vector decoding unit 704 of the enhancement layer. Thus, the decoding of the base layer and the decoding of the quantization coefficient of the enhancement layer are the same as in the second exemplary embodiment, and description thereof will be omitted. The present exemplary embodiment will be described by using the decoding of code data generated in the third exemplary embodiment as an example.

Figure 14:
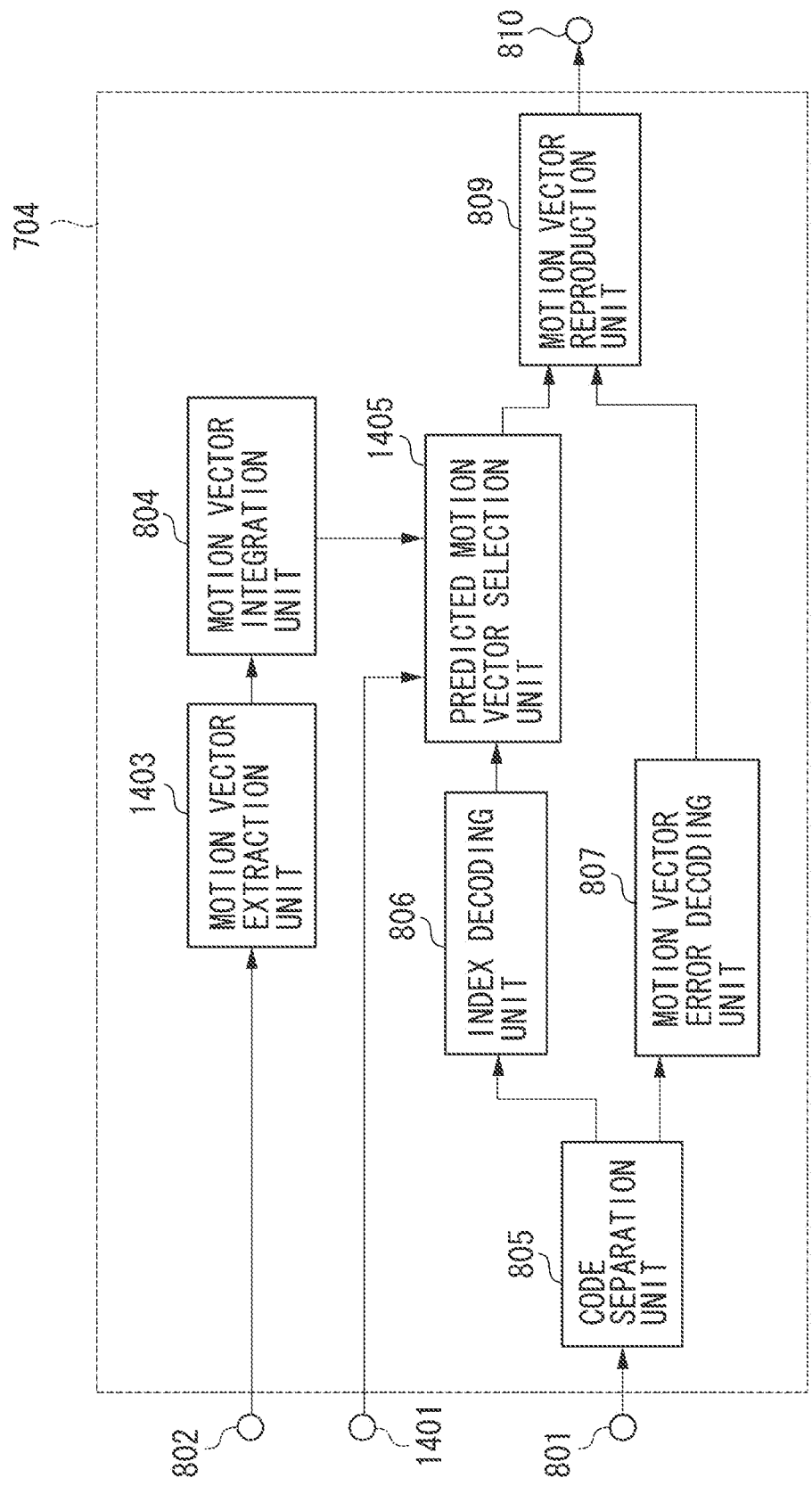
FIG. 14 is a detailed block diagram of a motion vector decoding unit 704 according to a fourth exemplary embodiment.

FIG. 14 is a block diagram illustrating a detailed configuration of the motion vector decoding unit 704 according to the present exemplary embodiment. In FIG. 14, parts providing similar functions to those in FIG. 9 according to the second exemplary embodiment are designated by the same reference numerals. Description thereof will be omitted. Similar to the terminal 901 in FIG. 9, a terminal 1401 inputs an interlayer predicted motion vector from the motion vector magnification unit 703. Similar to the motion vector extraction unit 1203 of the third exemplary embodiment, a motion vector extraction unit 1403 extracts motion vectors neighboring the block to be decoded of the enhancement layer or a motion vector of a previously decoded picture. A predicted motion vector selection unit 1405 selects a predicted motion vector from an interlayer predicted motion vector and a reference motion vector group according to identification information.

An operation for decoding a motion vector of the enhancement layer by the above-described configuration will be described.

The motion vector extraction unit 1403 extracts the motion vectors neighboring the block to be decoded of the enhancement layer or the motion vector of the previously decoded picture illustrated in FIG. 6. The extracted motion vector is input to the motion vector integration unit 804. Similar to the second exemplary embodiment, the motion vector integration unit 804 integrates motion vectors including the same components among the input motion vectors to generate a reference motion vector group. Similar to the second exemplary embodiment, the index decoding unit 806 decodes identification information code data to reproduce identification information. The predicted motion vector selection unit 1405 selects a predicted motion vector from an interlayer predicted motion vector and the reference motion vector group according to the identification information. Subsequently, similar to the second exemplary embodiment, the image decoding apparatus reproduces the motion vector to be decoded of the enhancement layer from the prediction error of the motion vector and the selected predicted motion vector.

Figure 15:
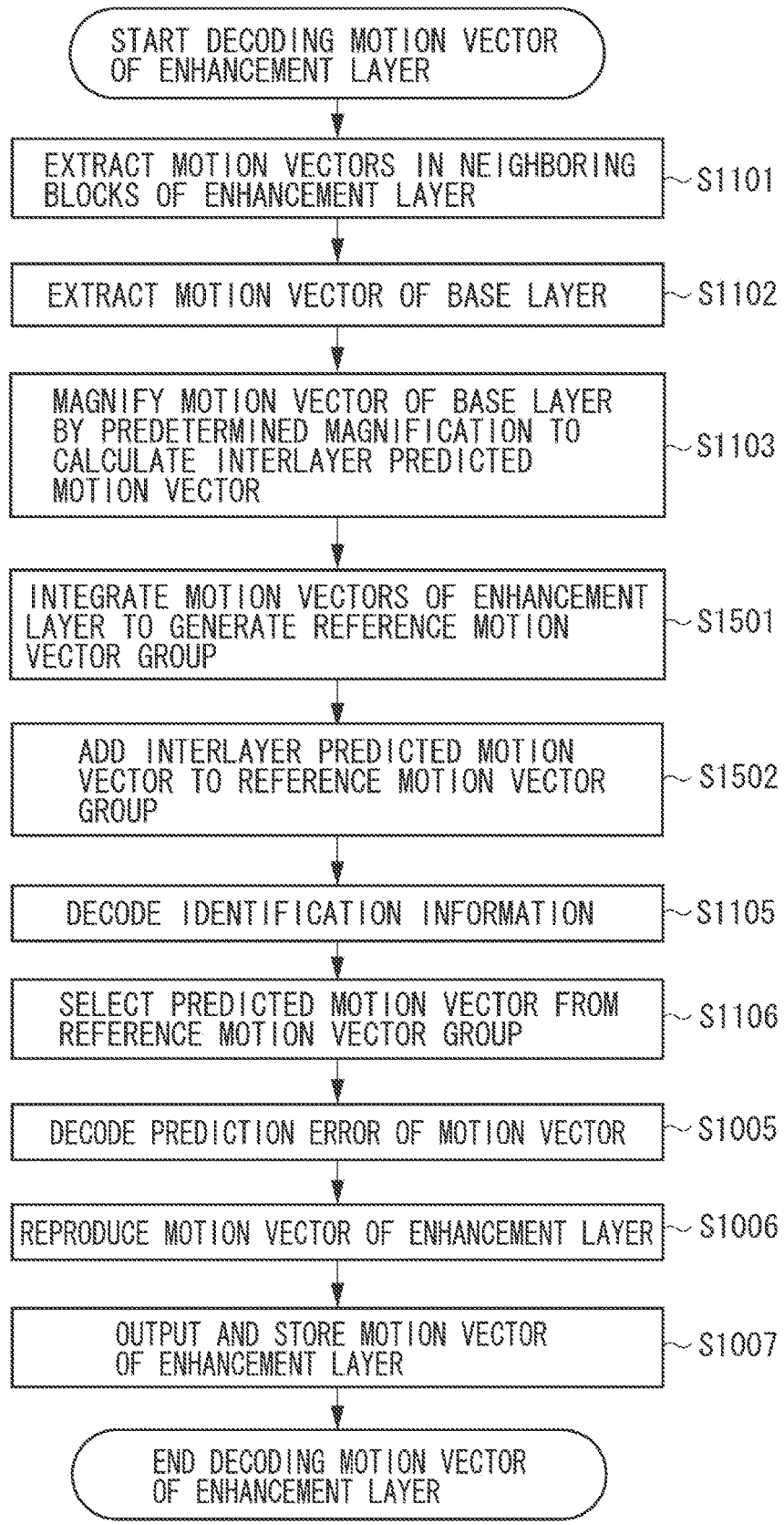
FIG. 15 is a flowchart illustrating processing for decoding a motion vector of an enhancement layer by an image decoding apparatus according to the fourth exemplary embodiment.

FIG. 15 is a flowchart illustrating processing for decoding a motion vector of the enhancement layer by the image decoding apparatus according to the fourth exemplary embodiment. In FIG. 15, steps for implementing similar functions to those of the steps in FIG. 11 are designated by the same reference numerals. Description thereof will be omitted.

Processing in steps S1101 to S1103 are similar to those of the second exemplary embodiment. More specifically, the image decoding apparatus extracts motion vectors neighboring the block to be decoded of the enhancement layer or a motion vector of a previously decoded picture, and calculates an interlayer predicted motion vector.

In step S1501, the image decoding apparatus integrates motion vectors including the same components among the motion vectors neighboring the block to be decoded of the enhancement layer or the motion vector of the previously decoded picture, and rearranges the resultant to generate a reference motion vector group. In step S1502, the image decoding apparatus adds the interlayer predicted motion vector to the top of the generated reference motion vector group.

Subsequently, similar to the processing for decoding a motion vector of the enhancement layer in FIG. 11 according to the second exemplary embodiment, the image decoding apparatus performs the processing in steps S1105 to S1007. More specifically, the image decoding apparatus decodes identification information, selects a predicted motion vector, reproduces the prediction error of the motion vector, and reproduces the motion vector in the block to be decoded of the enhancement layer.

According to the above-described configuration and operation, the image decoding apparatus can decode code data of the enhancement layer that is coded with a smaller amount of code by preferentially using the motion vector of the base layer over other motion vectors. This is because the interlayer predicted motion vector has extremely highly correlation with the motion vector in the block of the enhancement layer.

According to the present exemplary embodiment, the motion vector integration units 804 and 904 integrate motion vectors including the same components in order to improve the coding efficiency of coded data. However, the motion vector integration units 804 and 904 are not limited to this configuration. The motion vector integration units 804 and 904 may select a fixed number of motion vectors. The motion vector integration units 804 and 904 may even be omitted.

The blocks lying in the positions illustrated in FIG. 6 are referred to for the motion vectors of the reference motion vector group. However, the blocks and the motion vectors are not limited to this example.

According to the above-described exemplary embodiments, each of the processing units illustrated in FIGS. 1, 2, 3, 7, 8, 9, 12, and 14 are described to be implemented by hardware. However, the processing performed by the processing units illustrated in these drawings may be implemented by a computer program.

Figure 17:
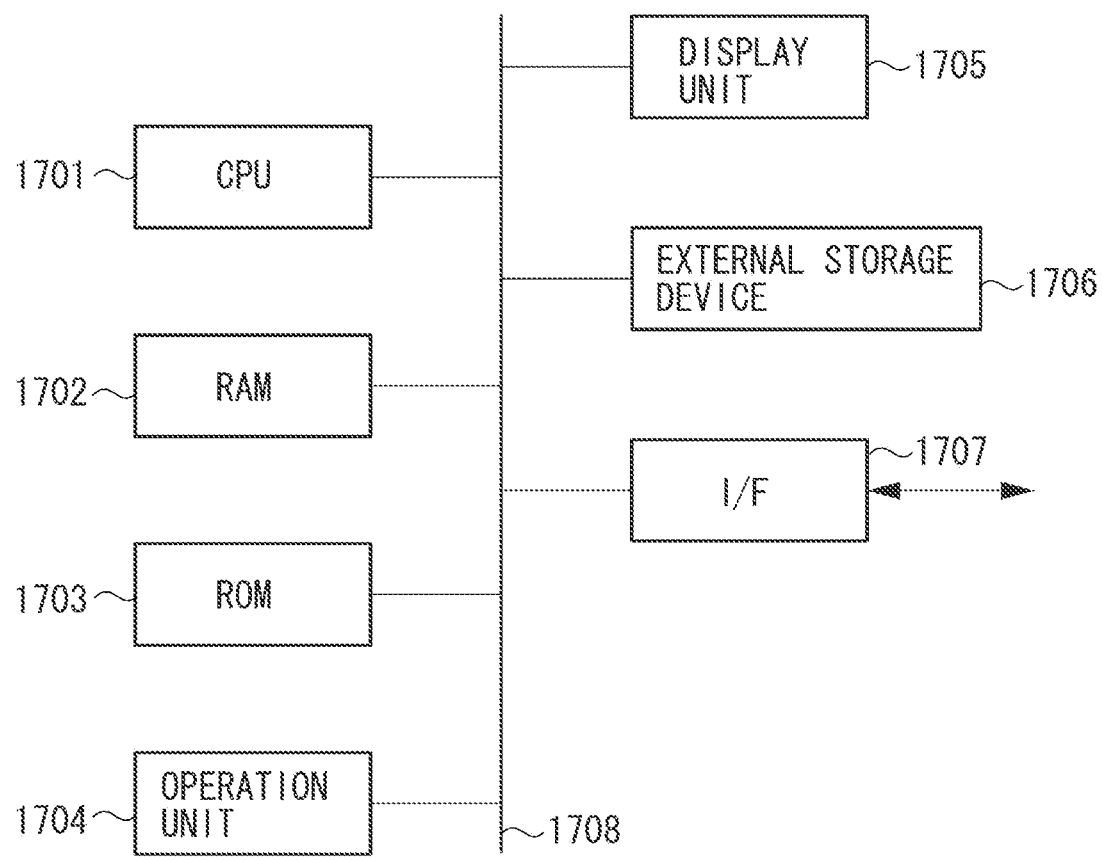
FIG. 17 is a block diagram illustrating an example of a hardware configuration of a computer applicable to an image coding apparatus and a decoding apparatus of the exemplary embodiments of the present invention.

FIG. 17 is a block diagram illustrating an example of hardware configuration of a computer that is applicable to the image coding or decoding apparatus according to the above-described exemplary embodiments.

A central processing unit (CPU) 1701 controls the entire computer with use of a computer program and data stored in a random access memory (RAM) 1702 and a read-only memory (ROM) 1703. Further, the CPU 1701 executes the processing that is described to be performed by the image coding or decoding apparatus according to the above-described exemplary embodiments. In other words, the CPU 1701 functions as the respective processing units illustrated in FIGS. 1, 2, 3, 7, 8, 9, 12, and 14.

The RAM 1702 includes an area for temporarily storing a computer program and data loaded from an external storage device 1706 and data acquired from outside via an interface (I/F) 1707. The RAM 1702 further includes a work area for the CPU 1701 to use when executing various types of processing. For example, the RAM 1702 can be allocated as a frame memory and can provide various other areas according to need.

The ROM 1703 stores setting data and a boot program of the computer. An operation unit 1704 includes a keyboard and a mouse. A user of the computer can operate the operation unit 1704 to input various instructions to the CPU 1701. A display unit 1705 displays the result of processing of the CPU 1701. The display unit 1705 may include, for example, a liquid crystal display.

The external storage device 1706 is a large-capacity information storage device, typified by a hard disk drive. The external storage device 1706 stores an operating system (OS) and the computer program for causing the CPU 1701 to implement the functions of the respective units illustrated in FIGS. 1, 2, 3, 7, 8, 9, 12, and 14. The external storage device 1706 may further store pieces of image data to be processed.

The computer program and data stored in the external storage device 1706 may be loaded into the RAM 1702 according to the control of the CPU 1701 when needed, and processed by the CPU 1701. Networks such as a local area network (LAN) and the Internet and other devices such as a projection apparatus and a display apparatus may be connected to the I/F 1707. The computer can acquire and transmit various information via the I/F 1707. A bus 1708 connects the above-described components.

With such a configuration, the CPU 1701 principally controls the operations described in the above-described flowcharts.

An exemplary embodiment of the present invention may be achieved by supplying a storage medium storing computer program code for implanting the above-described functions to a system, and reading and executing the computer program code by the system. In such a case, the computer program code itself read from the storage medium implements the functions of the above-described exemplary embodiments while the storage medium storing the computer program code constitutes the exemplary embodiment of the present invention. An exemplary embodiment of the present invention also covers situations where an operating system (OS) running on the computer executes a part or all of the actual processes based on instructions of the program code and the above-described functions are implemented such the processing.

Furthermore, the above-described functions may be implemented in the following mode. The computer program code read from the storage medium is written into a memory equipped in a function expansion card inserted in the computer or a function expansion unit connected to the computer. Based on instructions of the computer program code, a CPU of the function expansion card or the function expansion unit executes a part or all of the actual processing to implement the above-described functions.

When the exemplary embodiments of the present invention is applied to the storage medium, the storage medium stores the computer program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An encoding apparatus for encoding a predicted motion vector in a hierarchical coding process using a plurality of layers, the encoding apparatus comprising:
an obtainer configured to obtain, for prediction of a motion vector for a target block in a current picture on one of the plurality of layers, at least one of
(i) a first motion vector for a block, at a position corresponding to a position of the target block to be encoded, in a previous picture of the one of the plurality of layers before the current picture including the target block,
(ii) a second motion vector for a block, at a position corresponding to the position of the target block to be encoded, in a corresponding picture on another layer of the plurality of layers, and
(iii) a third motion vector for one of neighboring blocks of the target block to be encoded in the current picture on the one of the plurality of layers;
a generator configured to generate a candidate group of motion vectors used for prediction of a motion vector for the target block in the current picture on the one of the plurality of layers, the candidate group having the second motion vector and the third motion vector excluding the first motion vector if the second motion vector is in the candidate group, and the candidate group having the first motion vector and the third motion vector if the second motion vector is not in the candidate group;
a determiner configured to determine the predicted motion vector from the motion vectors in the generated candidate group for the target block; and
an encoder configured to encode information about the determined predicted motion vector for the target block in the current picture on the one of the plurality of layers.

2. The coding apparatus according to claim 1, wherein, the generator generates the candidate group without including at least one of duplicates of motion vectors as the third motion vector.

3. The coding apparatus according to claim 1, wherein the encoder encodes a difference value between the motion vector for the target block and the determined predicted motion vector.

4. The coding apparatus according to claim 1, wherein the information about the determined predicted motion vector is identification information indicating the predicted motion vector determined by the determiner.

5. The coding apparatus according to claim 1, wherein the obtainer obtains at least one motion vector, as the third motion vector, associated with a block adjacent to diagonally upper left, a block adjacent to above, a block adjacent to left, or blocks adjacent to other directions of the target block in the current picture on the one of the plurality of layers.

6. The coding apparatus according to claim 1, wherein the corresponding picture on the another layer of the plurality of layers has a lower resolution than the current picture on the one of the plurality of layers.

7. A decoding apparatus for decoding at least one blocks included in a picture of a video which is hierarchical coded using a plurality of layers, the decoding apparatus comprising:
an obtainer configured to obtain, for a target block in a current picture on one of a plurality of layers, at least one of
(i) a first motion vector for a block at a position, corresponding to a position of the target block to be decoded, of a previous picture on one of the plurality of layers before the current picture including the target block to be decoded,
(ii) a second motion vector for a block, at a position corresponding to the target block to be decoded, of a picture on another layer of the plurality layers, and
(iii) a third motion vector for one of neighboring blocks of the target block to be decoded of a picture in the one of the plurality of layers;
a generator configured to generate a candidate group of motion vectors used for prediction of a motion vector for the target block, the candidate group having the second motion vector and the third motion vector excluding the first motion vector if the second vector is in the candidate group, and the candidate group having the first motion vector and the third motion vector if the second motion vector is not in the candidate group;
a determiner configured to determine the predicted motion vector from the generated candidate group in accordance with information about a predicted motion vector for the target block received from a bit stream; and a decoder configured to decode the target block on the one of the plurality of layers using the determined predicted motion vector.

8. The decoding apparatus according to claim 7, wherein, the generator generates the candidate group without including at least one of duplicates of a motion vectors as the third motion vector.

9. The decoding apparatus according to claim 7, wherein the decoder decodes a difference value between the determined predicted motion vector and a motion vector for the target block and the motion vector for the target block is generated to decode the target block.

10. The decoding apparatus according to claim 7, wherein information about the determined predicted motion vector is identification information indicating the predicted motion vector.

11. The decoding apparatus according to claim 7, wherein the obtainer obtains at least one motion vector, as the third motion vector, associated with in a block adjacent to diagonally upper left, a block adjacent to above, a block adjacent to left, or blocks adjacent to other directions of the target block in the current picture on one of the plurality of the first layer.

12. The decoding apparatus according to claim 7, wherein the corresponding picture on the another layer of the plurality of layers has a lower resolution than the current picture on the one of the plurality of layers.

13. A method for encoding a predicted motion vector to be used for performing hierarchical coding on a picture using a plurality of layers, the method comprising:

obtaining for prediction of a motion vector for a target block in a current picture on one of the plurality of layers, at least one of
(i) a first motion vector for a block, at a position corresponding to a position of the target block to be encoded, in a previous picture on the one of the plurality of layers before the current picture including the target block,
(ii) a second motion vector for a block, at a position corresponding to the position of the target block to be encoded, in a corresponding picture on another layer of the plurality of layers, and
(iii) a third motion vector for one of neighboring blocks of the target block to be encoded in the current picture of the one of the plurality of layers;
generating a candidate group of motion vectors used for prediction of a motion vector for the target block in the current picture of the one of the plurality of layers, the candidate group having the second motion vector and the third motion vector excluding the first motion vector if the second motion vector is in the candidate group, and the candidate group having the first motion vector and the third motion vector if the second motion vector is not in the candidate group;
determining the predicted motion vector from the motion vectors in the generated candidate group for the target block; and
encoding information about the determined predicted motion vector for the target block in the current picture on the one of the plurality of layers.

14. A method for determining a predicted motion vector for decoding at least one blocks included in a picture of a video from a bit stream which is hierarchical coded using a plurality of layers, the method comprising:

obtaining, for generation of the predicted motion vector in a target block of a current picture on one of a plurality of layers, at least one of
(i) a first motion vector for a block at a position corresponding to the target block to be decoded of a previous picture before the current picture including the target block,
(ii) a second motion vector for a block, at a position corresponding to the target block to be decoded, of a picture in another layer of the plurality of layers, and
(iii) a third motion vector for one of neighboring blocks of the target block to be decoded of the current picture on one of the plurality of layers;
generating a candidate group of motion vectors used for prediction of a motion vector for the target block, the candidate group having the second motion vector and the third motion vector excluding the first motion vector if the second motion vector is in the candidate group, and the candidate group having the first motion vector and the third motion vector if the second motion vector is not in the candidate group;
determining the predicted motion vector from the generated candidate group for the target block in accordance with information about a predicted motion vector for the target block received from a bit stream; and
decoding the target block on the one of the plurality of layers using the determined predicted motion vector.

15. The method according to claim 14, wherein at least one motion vector is obtained, as the third motion vector, associated with in a block adjacent to diagonally upper left, a block adjacent to above, a block adjacent to left, or blocks adjacent to other directions of the target block in the current picture on one of the plurality of the first layer.

16. The method according to claim 14, wherein the corresponding picture on the another layer of the plurality of layers has a lower resolution than the current picture on the one of the plurality of layers.

17. A non-transitory computer readable storage medium storing instructions that, when executed by a processor, cause the processor to perform operations comprising:

obtaining for prediction of a motion vector for a target block in a current picture on one of the plurality of layers, at least one of
(i) a first motion vector for a block, at a position corresponding to a position of the target block to be encoded, in a previous picture on one of the plurality of layers before the current picture including the target block,
(ii) a second motion vector for a block, at a position corresponding to the position of the target block to be encoded, in a corresponding picture of another layer of the plurality of layers, and
(iii) a third motion vector for one of neighboring blocks of the target block to be encoded in the current picture of the one of the plurality of layers;
generating a candidate group of motion vectors used for prediction of a motion vector for the target block in the current picture of the one of the plurality of layers, the candidate group having the second motion vector and the third motion vector excluding the first motion vector if the second motion vector is in the candidate group, and the candidate group having the first motion vector and the third motion vector if the second motion vector is not in the candidate group;
determining the predicted motion vector from the motion vectors in the generated candidate group for the target block; and encoding information about the determined predicted motion vector for the target block in the current picture on the one of the plurality of layers.

18. A non-transitory computer readable storage medium storing instructions that, when executed by a processor, cause the processor to perform operations comprising:
obtaining, for generation of the predicted motion vector for a target block in a current picture on one of a plurality of layers, at least one of
  (i) a first motion vector for a block at a position, corresponding to the target block to be decoded, of a previous picture before the current picture including the target block,
  (ii) a second motion vector for a block, at a position corresponding to the target block to be decoded, of a picture on another layer of the plurality of layers, and
  (iii) a third motion vector for one of neighboring blocks of the target block to be decoded of the current picture on one of the plurality of first layers;
generating a candidate group of motion vectors used for prediction of a motion vector for the target block, the candidate group having the second motion vector and the third motion vector excluding the first motion vector if the second motion vector is in the candidate group, and the candidate group having the first motion vector and the third motion vector if the second motion vector is not in the candidate group;
determining the predicted motion vector from the generated candidate group in accordance with information about a predicted motion vector for the target block received from a bit stream; and
decoding the target block on the one of the plurality of layers using the determined predicted motion vector.

19. The non-transitory computer readable storage medium according to claim 18, wherein at least one motion vector is obtained, as the third motion vector, associated with in a block adjacent to diagonally upper left, a block adjacent to above, a block adjacent to left, or blocks adjacent to other directions of the target block in the current picture on one of the plurality of the first layer.

20. The non-transitory computer readable storage medium according to claim 18, wherein the corresponding picture on the another layer of the plurality of layers has a lower resolution than the current picture on the one of the plurality of layers.

* * * * *